(12) United States Patent
Harada et al.

(10) Patent No.: US 10,931,407 B2
(45) Date of Patent: Feb. 23, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Yu Jiang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 176 days.

(21) Appl. No.: 16/089,551

(22) PCT Filed: Mar. 30, 2017

(86) PCT No.: PCT/JP2017/013304
§ 371 (c)(1),
(2) Date: Sep. 28, 2018

(87) PCT Pub. No.: WO2017/170889
PCT Pub. Date: Oct. 5, 2017

(65) Prior Publication Data
US 2019/0116005 A1    Apr. 18, 2019

(30) Foreign Application Priority Data
Mar. 31, 2016   (JP) .............................. JP2016-073413

(51) Int. Cl.
*H04L 1/18*    (2006.01)
*H04W 16/14*   (2009.01)
(Continued)

(52) U.S. Cl.
CPC .......... *H04L 1/1819* (2013.01); *H04L 1/1614* (2013.01); *H04L 1/1671* (2013.01);
(Continued)

(58) Field of Classification Search
USPC ........................................................ 370/329
See application file for complete search history.

(56) References Cited

U.S. PATENT DOCUMENTS

2001/0048669 A1* 12/2001 Kelly ....................... H01Q 3/08
                                                        370/316
2006/0248228 A1* 11/2006 Ha ....................... H04L 12/2803
                                                        709/245
(Continued)

FOREIGN PATENT DOCUMENTS

EP          2955971 A1      12/2015
JP       2015002411 A        1/2015
(Continued)

OTHER PUBLICATIONS

Extended European Search report issed in counterpart European Patent Application No. 17775423.1, dated Feb. 2, 2019 (11 Pages).
(Continued)

*Primary Examiner* — Gregory B Sefcheck
*Assistant Examiner* — Majid Esmaeilian
(74) *Attorney, Agent, or Firm* — Osha Bergman Watanabe & Burton LLP

(57) ABSTRACT

In scheduling transmission of UL data in a plurality of subframes using single DCI, asynchronous re-transmission control of this UL data is appropriately performed. A user terminal according to an aspect of the present invention includes a receiving section that receives downlink control information (DCI) and a control section that controls transmission of an uplink shared channel in each of a plurality of subframes based on the DCI. The control section determines an HARQ process number (HPN) to use in each of the plurality of subframes based on a HPN field included in the DCI.

11 Claims, 19 Drawing Sheets

(51) Int. Cl.
    *H04W 72/04*    (2009.01)
    *H04W 74/08*    (2009.01)
    *H04L 1/16*     (2006.01)
    *H04W 72/14*    (2009.01)

(52) U.S. Cl.
    CPC .......... *H04L 1/1822* (2013.01); *H04L 1/1864* (2013.01); *H04W 16/14* (2013.01); *H04W 72/042* (2013.01); *H04W 72/0446* (2013.01); *H04W 72/0453* (2013.01); *H04W 72/14* (2013.01); *H04W 74/0808* (2013.01)

(56) References Cited

U.S. PATENT DOCUMENTS

| | | | |
|---|---|---|---|
| 2008/0273454 A1* | 11/2008 | Malkamaki | H04L 1/1838 370/216 |
| 2015/0358986 A1 | 12/2015 | Yang et al. | |
| 2016/0066343 A1 | 3/2016 | Lin et al. | |
| 2016/0157213 A1 | 6/2016 | Takeda et al. | |
| 2016/0337987 A1* | 11/2016 | Yi | H04L 5/0051 |
| 2017/0215172 A1 | 7/2017 | Yang et al. | |
| 2017/0223674 A1* | 8/2017 | Dinan | H04L 1/1861 |
| 2017/0273056 A1 | 9/2017 | Papasakellariou | |
| 2017/0367078 A1* | 12/2017 | Chun | H04L 27/26 |
| 2018/0212738 A1* | 7/2018 | Chun | H04L 69/22 |

FOREIGN PATENT DOCUMENTS

| | | |
|---|---|---|
| WO | 2016-021954 A1 | 2/2016 |
| WO | 2017/164626 A2 | 9/2017 |
| WO | 2017/164626 A3 | 8/2018 |

OTHER PUBLICATIONS

Office Action issued in counterpart Japanese Patent Application No. 2016-073413, dated Jun. 20, 2017 (12 Pages).
International Search Report issued in PCT/JP2017/013304, dated Jun. 20, 2017 (5 pages).
Written Opinion of the International Searching Authority issued in PCT/JP2017/013304, dated Jun. 20, 2017 (11 pages).
Samsung; "Discussion on multi-subframe scheduling for UL LAA"; 3GPP TSG RAN WG1 Meeting #84, R1-160557; St Julian's, Malta; Feb. 15-19, 2016 (2 pages).
Ericsson; "Impacts of asynchronous UL HARQ in LAA"; 3GPP TSG-RAN WG2 #89bis, Tdoc R2-151505; Bratislava, Slovakia; Apr. 20-24, 2015 (4 pages).
LG Electronics; "PUSCH transmission in LAA"; 3GPP TSG RAN WG1 meeting #84, R1-160625; St Julian's, Malta; Feb. 15-19, 2016 (5 pages).
Fujitsu; "Evalutation results for UL LBT and PUSCH Design"; 3GPP TSG RAN WG1 Meeting #84, R1-160490; St Julian's, Malta; Feb. 15-19, 2016 (9 pages).
NTT DOCOMO, INC.; "Discussion on UL scheduling design for eLAA"; 3GPP TSG RAN WG1 Meeting #84bis, R1-162800; Busan, Kora; Apr. 11-15, 2016 (6 pages).
Huawei, HiSilicon; "Multi-subframe scheduling design for eLAA"; 3GPP TSG RAN WG1 Meeting #85, R1-164075; Nanjing, China; May 23-27, 2016 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Realesase 8)"; Mar. 2010 (149 pages).
AT&T; "Drivers, Benefits and Challenges for LTE in Unlicensed Spectrum"; 3GPP TSG-RAN Meeting #62, RO-131701; Busan, Korea; Dec. 3-6, 2013 (3 pages).
Office Action issued in counterpart European Patent Application No. 17775423.1, dated Apr. 30, 2020 (5 Pages).
3GPP TSG RAN WG1 #82bis; R1-155429 "DL Control Signaling Overhead Reduction for Low Cost UEs" Samsung; Malmo, Sweden; Oct. 5-9, 2015 (4 pages).
3GPP TSG RAN WG1 Meeting #73; R1-132301 "HARQ considerations in multi-subframe scheduling" Nokia, Nokia Siemens Networks; Fukuoka, Japan; May 20-24, 2013 (4 pages).
3GPP TSG RAN WG1 Meeting #84; R1-160947 "Discussion on UL scheduling design for eLAA" NTT Docomo, Inc.; St Julian's, Malta; Feb. 15-19, 2016 (6 pages).
Office Action issued in Japanese Application No. 2018-072257; dated Apr. 10, 2019 (6 pages).
Office Action issued in Japanese Application No. 2018-072257; dated Jul. 29, 2019 (6 pages)

\* cited by examiner

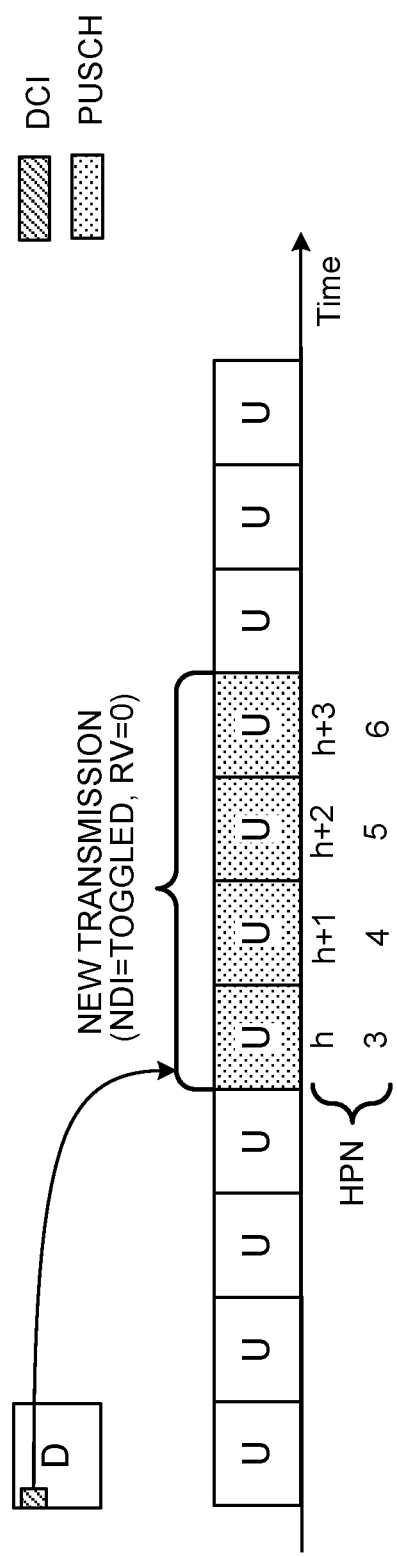

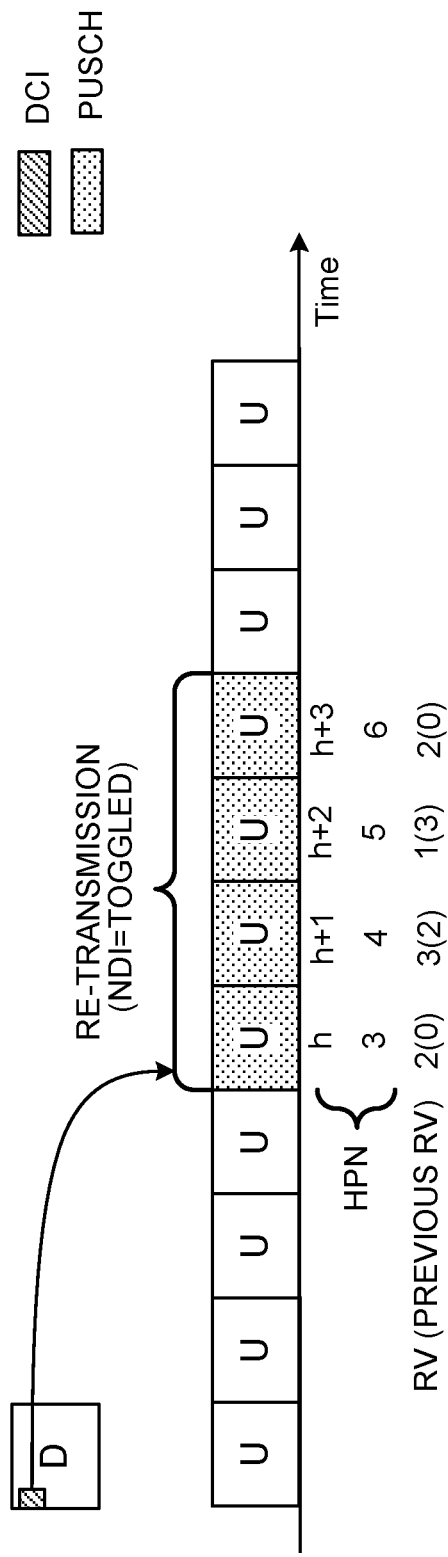

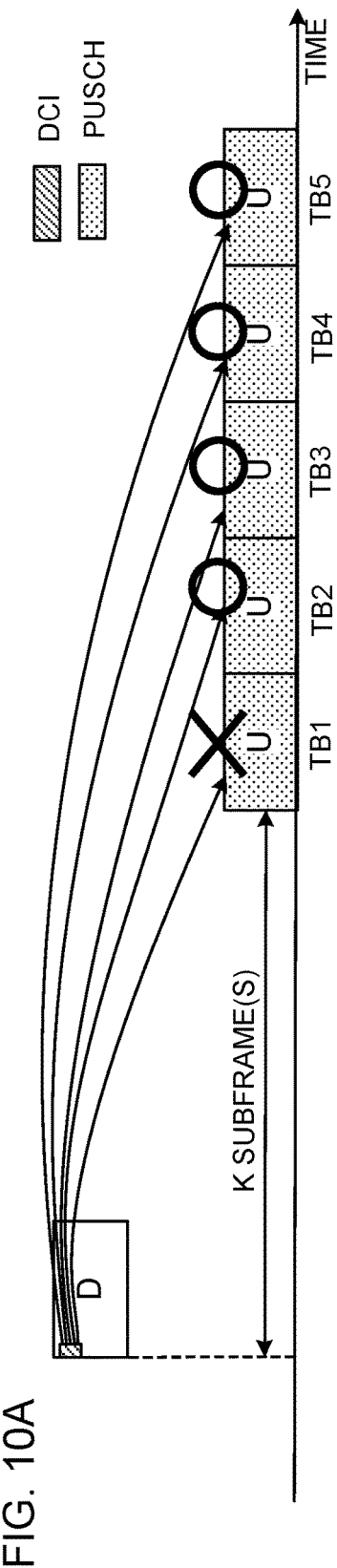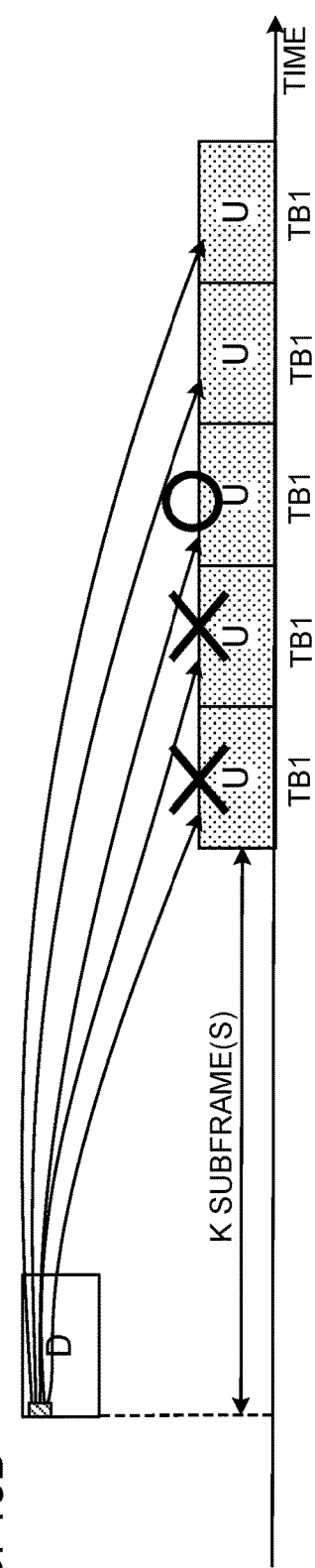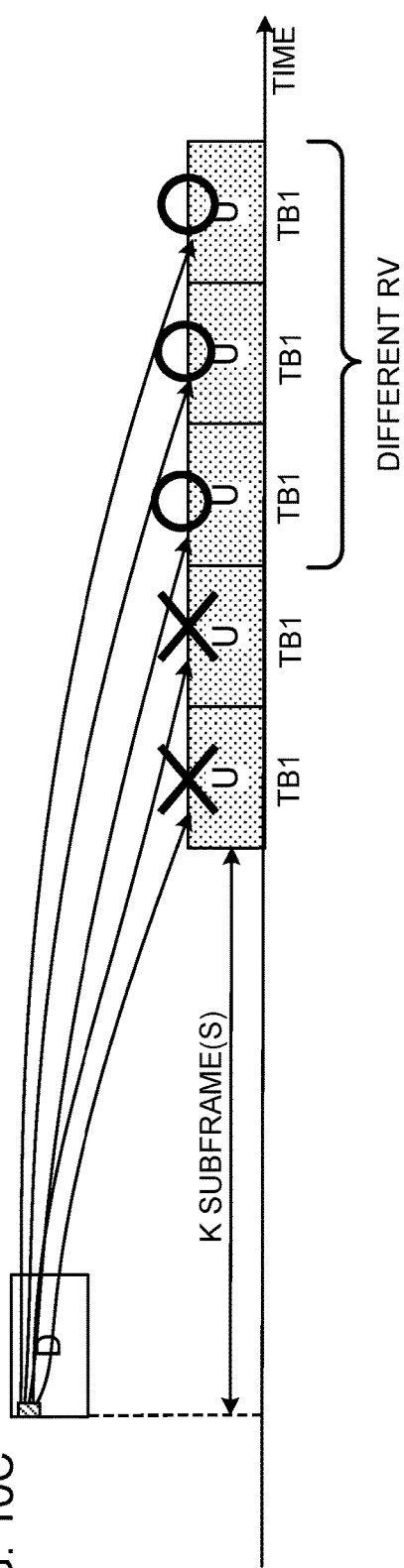
FIG. 10A
FIG. 10B
FIG. 10C

USER TERMINAL AND RADIO COMMUNICATION METHOD

TECHNICAL FIELD

The present invention relates to a user terminal and radio communication method in the next generation mobile communication system.

BACKGROUND ART

In UMTS (Universal Mobile Telecommunications System) networks, for the purpose of higher data rates, lower delay, and the like, Long Term Evolution (LTE) has been specified (Non-patent Literature 1). Moreover, for the purpose of wider bands and higher speed than LTE (referred to also as LTE Rel. 8 or 9), LTE-A (referred to also as LTE advanced. LTE Rel. 10, 11 or 12) has been specified, and a successor system of LTE (e.g., referred to also as FRA (Future Radio Access), 5G (5th generation mobile communication system), LTE Rel. 13 or the like) has been also studied.

In LTE of Rel. 8-12, specification has been made assuming that an exclusive operation is performed in a frequency band (referred to also as a licensed band) licensed to a telecommunication carrier (operator). As the licensed band, for example 800 MHz, 1.7 GHz, 2 GHz, or the like is used.

Recently, the proliferation of high performance user terminals (UE: User Equipment), such as a smart phone and a tablet, are abruptly increasing the user traffic. In order to absorb the increasing user traffic, an additional frequency band is required to be added, but there is a limit on the spectrum (licensed spectrum) of a licensed band.

Therefore, in Rel. 13 LTE, expansion of the frequency of an LTE system by utilizing a band (referred to also as an unlicensed band) of an unlicensed spectrum available other than the licensed band has been studied (Non-patent Literature 2). As the unlicensed band, utilization of for example a 2.4 GHz bandwidth, a 5 GHz bandwidth, or the like for enabling Wi-Fi (Registered Trademark) or Bluetooth (Registered Trademark) has been studied.

Specifically, in Rel. 13 LTE, Carrier Aggregation (CA) between a licensed band and an unlicensed band has been studied. Thus, the telecommunication to be performed using an unlicensed band together with a licensed band is referred to as LAA (License-Assisted Access). Note that, in the future, Dual Connectivity (DC) of a licensed band and an unlicensed band or Stand-Alone (SA) of an unlicensed band may be a subject to be studied for LAA.

CITATION LIST

Non-Patent Literature

[Non-Patent Literature 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010
[Non-Patent Literature 2] AT&T, "Drivers, Benefits and Challenges for LTE in Unlicensed Spectrum," 3GPP TSG RAN Meeting #62 RP-131701

SUMMARY OF INVENTION

Technical Problem

In an Uplink (UL) of an unlicensed band, it is contemplated that re-transmission control (HARQ: Hybrid Automatic Repeat reQuest) of UL data is asynchronously performed. Moreover, in the UL of an unlicensed band, it has been studied that the multi-subframe scheduling for scheduling the transmission of UL data in a plurality of subframes by using single Downlink Control Information (DCI) (e.g., UL grant) is supported.

However, in the UL of an unlicensed band, when the transmission of UL data in a plurality of subframes is scheduled using single DCI, asynchronous re-transmission control of this UL data might not be able to be appropriately performed. Moreover, such a problem might happen also in the UL of a licensed band.

The present invention has been made in view of such conventional problems, and it is an object of the present invention to provide a user terminal and radio communication method capable of appropriately performing asynchronous re-transmission control of UL data when the transmission of this UL data is scheduled using single DCI in a plurality of subframes.

Solution to Problem

A user terminal according to an aspect of the present invention includes: a receiving section for receiving Downlink Control Information (DCI); and a control section for controlling transmission of an uplink shared channel of a plurality of subframes based on this DCI, and based on a value in a HARQ process number (HPN) field included in the DCI, an HPN used in each of the plurality of subframes is to be determined.

Advantageous Effects of Invention

According to the present invention, in scheduling the transmission of UL data in a plurality of subframes using single DCI, asynchronous re-transmission control of this UL data can be appropriately performed.

BRIEF DESCRIPTION OF DRAWINGS

FIGS. 6A and 6B illustrate a first NDI/RV determination example according to a second aspect of this Embodiment.
FIGS. 8A and 8B illustrate a third NDI/RV determination example according to the second aspect of this Embodiment.
FIGS. 10A to 10C illustrate an example of UL data transmission after listening according to this Embodiment.

DESCRIPTION OF EMBODIMENTS

Figure 1A:
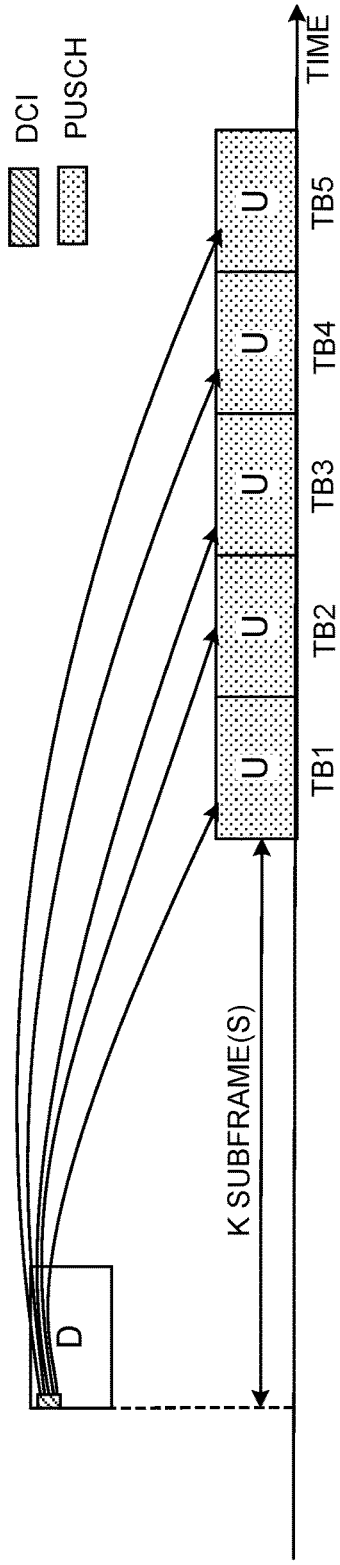
FIGS. 1A to 1C illustrate an example of multi-subframe scheduling.

In a system (e.g., LAA system) which operates LTE/LTE-A in an unlicensed band, an interference control function may be needed for coexistence with LTE, Wi-Fi, or another system of another carrier. Note that, systems which operate LTE/LTE-A in an unlicensed band may be collectively referred to as LAA, LAA-LTE, LTE-U, U-LTE, or the like regardless of whether the operation form of the system is any of CA, DC, or SA.

Generally, a transmission point (e.g., a radio base station (eNB), a user terminal (UE), or the like) which carries out communications using a carrier (may be referred to as a carrier frequency or simply referred to as a frequency) in an unlicensed band is prohibited from transmitting a signal using this carrier when it has detected another entity (e.g., another user terminal) which carries out communications using this carrier in this unlicensed band.

Therefore, the transmission point executes Listening (LBT: Listen Before Talk) at a timing which is earlier than the transmission timing by a predetermined period. Specifically, a transmission point which executes LBT searches the whole target carrier band (e.g., one component carrier (CC)) at a timing which is earlier than the transmission timing by a predetermined period, and confirms whether or not another apparatus (e.g., a radio base station, a user terminal, a Wi-Fi apparatus, or the like) is communicating in this carrier band.

Note that, in this specification, the listening refers to an operation to detect/measure whether or not a signal of a level exceeding a specified level (e.g., a predetermined power) is being transmitted from another transmission point before a certain transmission point (e.g., a radio base station, a user terminal, or the like) transmits a signal. Moreover, the listening performed by a radio base station and/or a user terminal may be referred to also as LBT, CCA (Clear Channel Assessment), carrier sense, or the like.

A transmission point transmits a signal using a relevant carrier when it could confirm that another apparatus is not communicating. For example, if a received power (received-signal power during LBT) measured using LBT is equal to or less than a predetermined threshold, a transmission point determines that the channel is in an idle state ($LBT_{idle}$), and transmits a signal. The sentence "a channel is in an idle state" is, in other words, "a channel is not occupied by a specific system", and is referred also to as "a channel is idle", "a channel is clear", "a channel is free", or the like, On the other hand, a transmission point cancels its own transmission processing when it has detected that another apparatus is using even a part of a target carrier band. For example, when having detected that the received power of a signal from another apparatus related to a relevant bandwidth exceeds a predetermined threshold, a transmission point determines that the channel is in a busy state ($LBT_{busy}$), and the transmission point will not transmit a signal. In the case of $LBT_{busy}$, only after the transmission point could confirm that this channel is in an idle state by LBT, the channel becomes available. Note that, the method for determining, by LBT, if a channel is in an idle state or in a busy state is not limited thereto.

As the mechanism (scheme) for LBT, FBE (Frame Based Equipment) and LBE (Load Based Equipment) have been studied. The differences between the both are the frame configuration used for transmission/reception, a channel occupation time, and the like. The FBE has a configuration of transmission/reception related to LBT having a fixed timing, and is referred to also as Category 2 or the like. Moreover, the LBE has a configuration of transmission/reception related to LBT not fixed in the time-axis direction, in which LBT is performed on demand, and is referred to also as Category 4 or the like. Note that a case where transmission is performed without LBT is referred to also as Category 1 or the like.

Specifically, the FBE is a mechanism that has a fixed frame period and transmits if a channel is available as the result of performing carrier sense for a predetermined time period (may be referred to as an LBT duration or the like) in a predetermined frame, but does not transmit and wait until a carrier sense timing in the next frame if a channel is unavailable.

On the other hand, the LBE is a mechanism, in which an ECCA (Extended CCA) procedure is performed for extending a carrier sensing time period if a channel is unavailable as the result of performing carrier sense (initial CCA), and continuously performing carrier sense until a channel becomes available. In the LBE, random back-off is required for appropriate conflict avoidance.

Note that the carrier sensing time period (may be simply referred to as the carrier sensing duration) is the time period (e.g., one symbol length) required for processing the listening or the like in order to obtain one LBT result and determining whether or not a channel is available.

A transmission point can transmit a predetermined signal (e.g., channel reservation signal) in accordance with the LBT result. Here, the LBT result refers to the information (e.g., $LBT_{idle}$, $LBT_{busy}$) about the idle state of a channel which is obtained by LBT in a carrier to be subjected to LBT.

Moreover, in starting transmission when the LBT result indicates an idle state ($LBT_{idle}$), a transmission point can omit LBT and transmit a signal during a predetermined period (e.g., 10 to 13 ms). Such transmission is referred to also as burst transmission, burst, transmission burst, or the like.

As described above, by introducing, in an LAA system, into a transmission point, the control on interference within an identical frequency based on the LBT mechanism, interference between LAA and Wi-Fi, interference between LAA systems, and the like can be avoided. Moreover, even in a case where a transmission point is independently controlled for each operator who operates an LAA system, interference can be reduced without grasping each control content by LBT.

Moreover, in an LAA system, a user terminal performs RRM (Radio Resource Management) measurement (including RSRP (Reference Signal Received Power) measurement and the like) for detecting a cell (secondary cell (SCell)) of an unlicensed band. As the signal for this RRM measurement, use of a Discovery Reference Signal (DRS) has been studied.

The DRS used in an LAA system may be configured to include at least one of a synchronous signal (PSS (Primary Synchronization Signal)/SSS (Secondary Synchronization Signal)), a Cell-specific Reference Signal (CRS), and a Channel State Information Reference Signal (CSI-RS). DRS is transmitted in a DMTC duration having a predetermined periodicity (referred to also as DMTC periodicity: Discovery Measurement Timing Configuration Periodicity). Note that, this DRS may be referred to also as a signal for detection, a signal for detection measurement, a discovery signal (DS: Discovery Signal), LAA DRS, LAA DS, or the like.

Moreover, in an LAA system, a user terminal performs CSI measurement using the CRS or/and CSI-RS (hereinafter, referred to as CRS/CSI-RS) which is transmitted in a cell of an unlicensed band, and reports the measurement result to a radio base station (referred to as CSI reporting). Note that, this CRS may be a CRS included in each subframe in which downlink transmission is performed, or may be a CRS constituting the DRS. Moreover, this CSI-RS is the CSI-RS transmitted at a predetermined cycle (e.g., 5 ms, 10 ms), and is set separately from a CSI-RS constituting the DRS.

Moreover, in an LAA system, it is also assumed that when LBT is successful (when a channel is in an idle state), the minimum transmission bandwidth used by a transmission point will be restricted to be equal to or greater than a predetermined bandwidth (e.g., 5 MHz or 4 MHz).

Incidentally, it has been studied that "asynchronous re-transmission control (asynchronous HARQ) is supported in the UL of an unlicensed band". In the synchronous re-transmission control (synchronous HARQ), the re-transmission of UL data for each HARQ process is performed after a fixed period of time from the first-time transmission of this UL data. On the other hand, in the asynchronous HARQ, the re-transmission of UL data for each HARQ process is performed after an unfixed period of time from the first-time transmission of this UL data.

In the asynchronous HARQ, the re-transmission control information about UL data is transmitted to a user terminal from a radio base station at an arbitrary timing. For example, a radio base station may transmit the re-transmission control information about UL data including DCI (e.g., UL grant), while a user terminal may perform the first-time transmission or re-transmission of UL data using an Uplink Shared Channel (PUSCH: Physical Uplink Shared Channel) allocated by this DCI. Note that a radio base station may transmit the re-transmission control information about UL data to a user terminal using PHICH (Physical Hybrid-ARQ Indicator Channel).

Here, the re-transmission control information may include ACK (Acknowledge) indicative of successful reception of UL data, NACK (Negative ACK) indicative of unsuccessful reception of UL data, and the like, and may be referred to as HARQ-ACK, or the like.

In the asynchronous HARQ, a user terminal may perform, in receiving the DCI including ACK, the first-time transmission of UL data using the PUSCH allocated by this DCI. On the other hand, a user terminal may perform, in receiving the DCI including NACK, the re-transmission of UL data using the PUSCH allocated by this DCI.

Moreover, it has been also studied that "in the UL of an unlicensed band, multi-subframe scheduling for scheduling the transmission of a PUSCH in at least one subframe is supported by DCI in one subframe."

FIG. 1 illustrates an example of the multi-subframe scheduling. As illustrated in FIG. 1, in the multi-subframe scheduling, PUSCH transmission in N (N24) subframes after the k-th (k24) is scheduled using a single or plurality of DCI in one subframe. Note that N subframes may be continuous subframes, or may be discontinuous subframes.

In FIG. 1A, the PUSCH transmission in five subframes (U) is scheduled using a single DCI transmitted in a subframe (D). Moreover, in FIG. 1A, UL data (transport blocks (TB 1 to TB 5)) each different in five subframes are scheduled. A user terminal can transmit UL data continuously from a timing at which listening was successful. For example, if listening is successful in the first subframe (or immediately before the first subframe), a user terminal can transmit UL data in five continuous subframes.

Figure 1B:
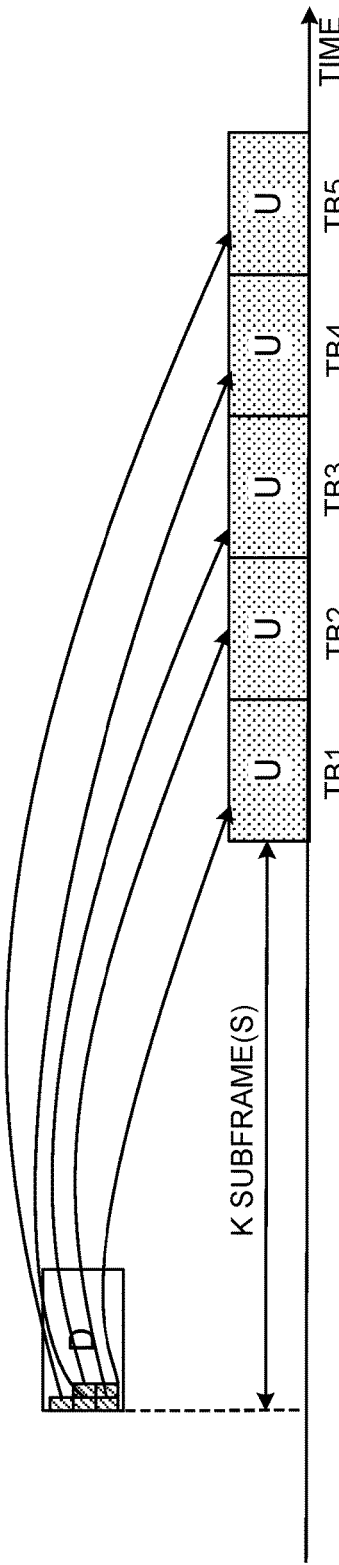

In FIG. 1B, the PUSCH transmission in five different subframes (U) is scheduled using five DCI transmitted in the subframe (D). Moreover, in FIG. 1B, each different UL data (TB 1 to TB 5) is scheduled using five DCI. A user terminal can transmit UL data continuously from a timing at which listening was successful. In FIG. 1B, because DCI is required for each UL subframe, the overhead in the DL subframe might increase.

Figure 1C:
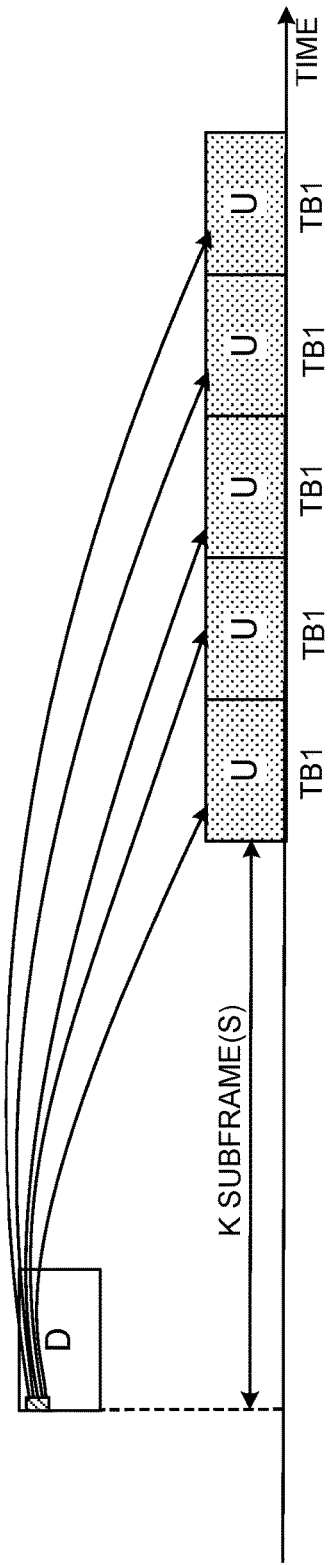

In FIG. 1C, the PUSCH transmission in five subframes (U) is scheduled using a single DCI transmitted in the subframe (D). Moreover, in FIG. 1C, identical UL data (TB 1) is scheduled in five subframes. A user terminal transmits scheduled UL data (TB 1) only in the first subframe in which listening was successful.

In FIG. 1C, even if listening is unsuccessful in the first subframe (or immediately before the first subframe), it is highly likely that listening becomes successful in the subsequent subframe (or immediately before the subsequent subframe) and that UL data can be transmitted. Therefore, as compared with the case (e.g., FIG. 1A) where UL data, which could not be transmitted due to unsuccessful listening, is scheduled again using DCI, a reduction in delay relative to specific UL data (e.g., TB 1) can be achieved.

Referring to FIG. 2, a method (e.g., a scheduling method in FIG. 1A or FIG. 1C) for scheduling the transmission of PUSCH in a plurality of subframes with single DCI will be described. FIG. 2 illustrates an example of the multi-subframe scheduling with single DCI.

Figure 2A:
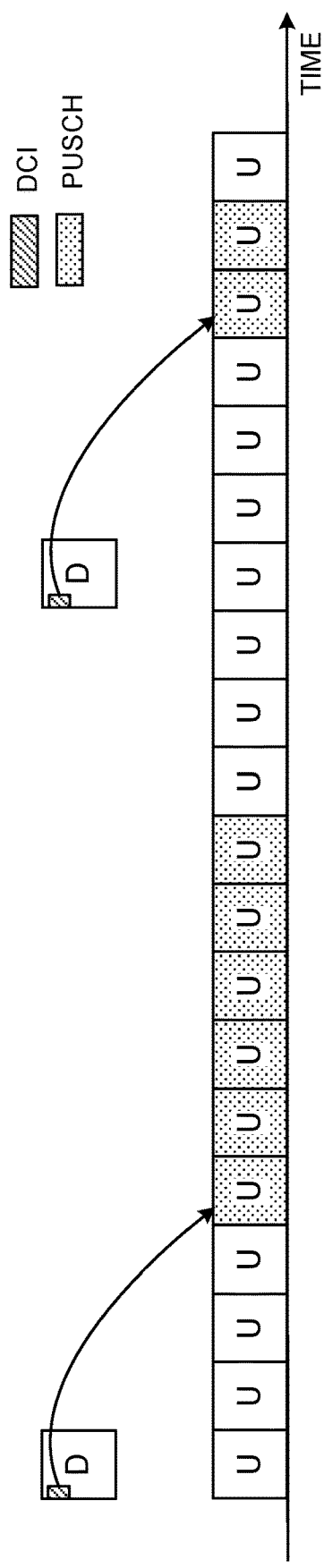
FIGS. 2A and 2B illustrate an example of multi-subframe scheduling with single DCI.

When the transmission of PUSCH in a plurality of subframes is scheduled using single DCI, a plurality of subframes to be scheduled may be specified utilizing a predetermined field in DCI as illustrated in FIG. 2A. For example, in FIG. 2A, six subframes after k subframes (here k=4) are specified with the first DCI. Moreover, two subframes after k subframes are specified with the next DCI.

Figure 2B:
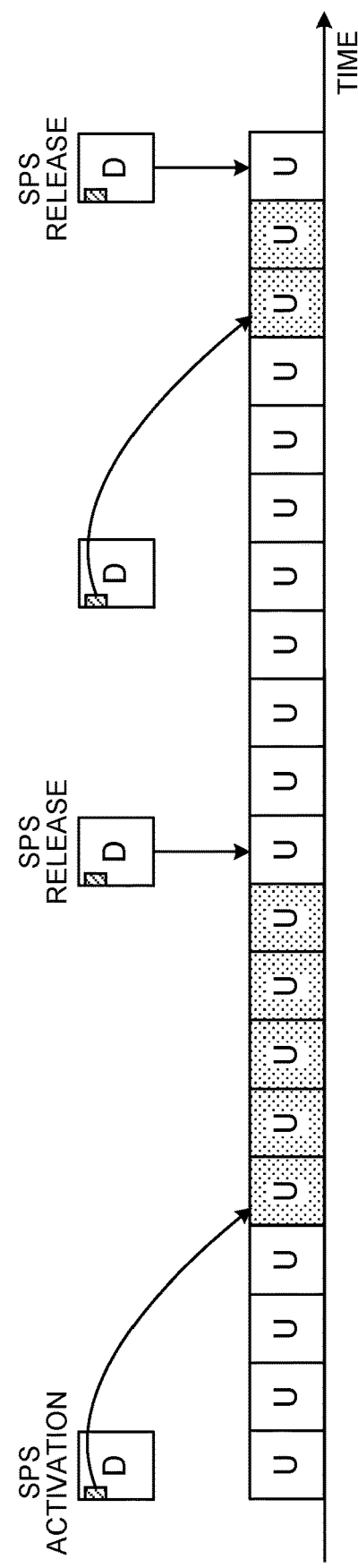

Alternatively, as illustrated in FIG. 2B, a plurality of subframes to be scheduled may be specified utilizing semi-persistent scheduling (SPS)-RNTI (Radio Network Temporary ID). For example, in FIG. 2B, the cycle of SPS is set to one subframe, and the activation and release of the allocated resource of SPS are controlled using the DCI which was scrambled (masked) by SPS-RNTI.

In the case of FIG. 2B, DCI for specifying the release of the allocated resource of SPS is needed, so the overhead will increase as compared with the case of FIG. 2A. Therefore, from the viewpoint of reducing the overhead, the method illustrated in FIG. 2A is preferred.

However, in a case where in the UL of an unlicensed band the transmission of UL data in a plurality of subframes is scheduled using single DCI (e.g., the method illustrated in FIG. 2A), asynchronous HARQ of this UL data might not be able to be appropriately performed.

Then, the present inventors have studied a method for appropriately performing, even when the transmission of UL data in a plurality of subframes is scheduled using single DCI, asynchronous HARQ of this UL data, and has reached the present invention.

Hereinafter, an embodiment of the present invention will be described in detail with reference to the accompanying drawings. Note that, in this embodiment, the carrier (cell) to be subjected to LBT will be described as an unlicensed band, but not limited thereto. This embodiment can be applicable regardless of a licensed band or an unlicensed band, if a frequency carrier (cell) is the frequency carrier (cell) to be subjected to listening.

Moreover, in this embodiment, a case where CA or DC between a carrier (e.g., a primary cell (PCell) of a licensed band) not to be subjected to listening and a carrier (e.g., a secondary cell (SCell) of an unlicensed band) to be subjected to listening is applied, is assumed, but not limited thereto. For example, this embodiment can be applied also to a case where a user terminal stand-alone connects to a carrier (cell) to be subjected to listening.

In this embodiment, a user terminal transmits UL data via a PUSCH (uplink shared channel), receives the re-transmission control information about this UL data, and controls the transmission of this UL data based on this re-transmission control information. Moreover, in this embodiment, multi-subframe scheduling for scheduling a PUSCH in a plurality of subframes using single downlink control information (DCI) is applied.

Figures 3A, 3B:
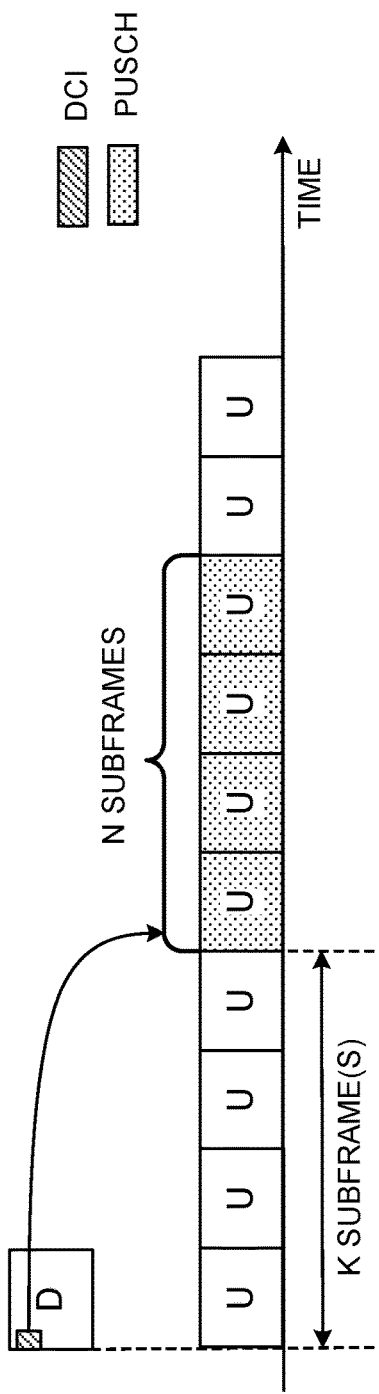
FIGS. 3A and 3B illustrate an example of multi-subframe scheduling according to this Embodiment.

FIG. 3 illustrates an example of the multi-subframe scheduling according to this embodiment. As illustrated in FIG. 3A, in this embodiment, PUSCH in continuous subframes after k subframes (k≥0, in FIG. 3A k=4) from the subframe receiving this single DCI is scheduled using single DCI.

In FIG. 3A, this single DCI includes the information (hereinafter, referred to as subframe information) indicative of the number N of subframes in which PUSCH is to be scheduled. For example, this subframe information may be the value (hereinafter, referred to as UL index field value) of a UL index field as illustrated in FIG. 3B. Here, the UL index field is the field within the UL grant for specifying a subframe, in which PUSCH transmission is scheduled in a UL/DL configuration 0 of the existing TDD (Time Division Duplex) scheme.

As illustrated in FIG. 3B, the UL index field values of 2 bits "00", "01", "10", and "11" each indicate that the number N of subframes to be scheduled is "1", "2", "4", and "8", respectively. Note that the number n of subframes indicated by the UL index field value is not limited to those illustrated in FIG. 3B.

The multi-subframe scheduling is not applied if the UL index field value is "00", and if the UL index field value is either of "01", "10", or "11", the multi-subframe scheduling is applied.

For example, in FIG. 3A, DCI includes the UL index field value "10", and with this DCI, PUSCH in four continuous subframes (i.e., N=4 in FIG. 3B) indicated by this UL index field value "10" is subjected to multi-subframe scheduling at a user terminal.

Note that the subframe information indicative of the number of subframes to be scheduled is not limited to the UL index field value, but may be the value of another field in DCI. Moreover, the number of bits of the UL index field or another field is not limited to 2 bits, but may be 1 bit or may be equal to or greater than 3 bits.

Moreover, in FIG. 3A, to a plurality of subframes to be scheduled using single DCI, respectively, different UL data (TB) may be allocated (referred to as the first UL data allocation scheme) or identical UL data may be allocated (referred to as the second UL data allocation scheme). The first UL data allocation scheme may be used in the first and second aspects described later, while in the third aspect, the second UL data allocation scheme may be used.

Moreover, in FIG. 3A, a user terminal performs listening in the first subframe (or immediately before the first subframe) in the scheduled N subframes. If successful in this listening, a user terminal can transmit UL data in the N continuous subframes. In this case, a user terminal can omit the listening in the subsequent subframe (or immediately before the subsequent subframe).

On the other hand, if listening of the first subframe (or immediately before the first subframe) is unsuccessful, a user terminal will perform listening in the next subframe (or immediately before the next subframe) until it succeeds in listening. Thus, a user terminal can transmit UL data in a subframe or the subsequent subframe, in which listening was successful, among the scheduled N subframes.

(First Aspect)

In a first aspect, a method will be described for determining the respective HARQ process numbers (HPN) of a plurality of subframes to be scheduled using single DCI.

Here, the HARQ process number (HPN) is the indicator of an HARQ process which is the processing unit of re-transmission control. A plurality of HARQ processes are set in a user terminal, where re-transmission control of UL data is performed for each HARQ process. Usually, in the HARQ process of the same HPN, until ACK is received after the first-time transmission of UL data, the re-transmission of this UL data will be performed.

In the first aspect, a user terminal determines, when PUSCH in a plurality of subframes is scheduled using single DCI, an HPN different among the plurality of subframes. Specifically, an HPN different among the plurality of subframes may be determined based on a predetermined rule set in a user terminal and on the information included in DCI (referred to as a first determination example), or may be determined based on a predetermined rule set in a user terminal and without based on the information included in DCI (referred to as a second determination example).

<First HPN Determination Example>

FIG. 4 illustrates an example of the first HPN determination according to the first aspect. In the first HPN determination example, a user terminal may determine an HPN used in each of a plurality of subframes based on the value (hereinafter, referred to as an HPN field value) of the HARQ process number (HPN) field included in DCI.

In FIG. 4, as a predetermined rule, "when the HPN index field value in DCI is h, HPN of the subframe n (0≤n≤N−1) among N (N≥1) subframes in which PUSCH is scheduled is h+n" is set in a user terminal. Moreover, "when HPN of the subframe n exceeds a maximum value L, the HPN of the subframe n is h+n−L" is set in a user terminal.

Note that, this predetermined rule is just an example, but not limited thereto. Moreover, this predetermined rule may be set using higher layer signaling or broadcast information, or may be stored in a user terminal in advance.

Figures 4A, 4B:
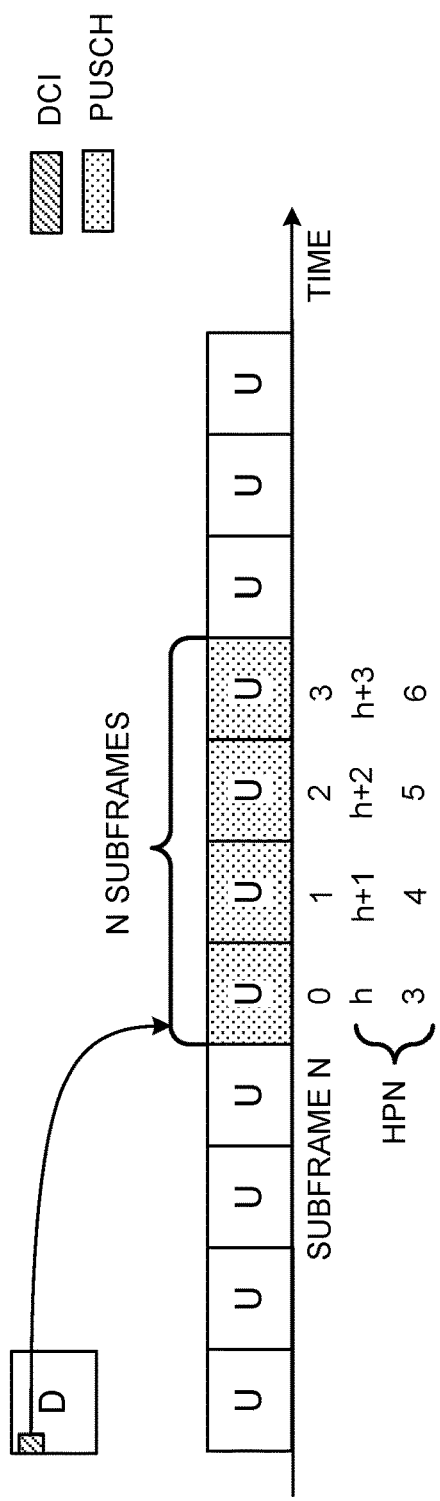
FIGS. 4A and 4B illustrate a first HPN determination example according to a first aspect of this Embodiment.

For example, as illustrated in FIG. 4B, a case is assumed, where a UL index field value "10" and a HPN field value "3" are included in DCI. In this case, as illustrated in FIG. 4A, using this DCI, PUSCH is scheduled in four continuous subframes indicated by the UL index field value "10" (see FIG. 3B).

Moreover, because the HPN field value h is "3", the HPN of the subframe 0 is h+n=3+0=3. The HPN of Subframe 1 is h+n=3+1=4. The HPN of Subframe 2 becomes h+n=3+2=5. The HPN of Subframe 3 becomes h+n=3+3=6.

In this manner, in the first HPN determination example, the HPN field value in this DCI is applied to the HPN of the first subframe. In the HPN of the subsequent subframe, one is added (carried) to the HPN of the previous subframe. Moreover, if the added HPN exceeds the maximum value, the HPN of this subframe returns to zero.

In the first HPN determination example, the HPN of each subframe to be scheduled is determined based on the HPN field value of DCI, so also when the asynchronous HARQ is supported in multi-subframe scheduling, the re-transmission control of UL data can be appropriately performed.

<Second HPN Determination Example>

FIG. 5 illustrates the second HPN determination example according to the first aspect. In the second HPN determination example, a user terminal may determine an HPN used in each of a plurality of subframes based on at least one of the index (hereinafter, referred to as the subframe index) of a subframe, the index (hereinafter, referred to as the TTI index) of a Transmission-Time Interval (TTI), and a total numbers of HARQ processes. Note that, in the following, differences from FIG. 4 will be mainly described.

In FIG. 5, as a predetermined rule, "the HPN of each subframe subjected to multi-subframe scheduling is the remainder (modulo) of the TTI index and a total number of HARQ processes" is set in a user terminal. The TTI index may be expressed by Formula (1) below. In Formula (1) below, SFN is a System Frame Number (SFN).

$$TTI\ index = SFN \times 10 + subframe\ index. \tag{1}$$

Note that, this predetermined rule is just an example, but not limited thereto. For example, a predetermined parameter may be given in the operation of the above-described remainder. Moreover, this predetermined rule may be set using higher layer signaling or broadcast information, or may be stored in a user terminal in advance.

Figures 5A, 5B:
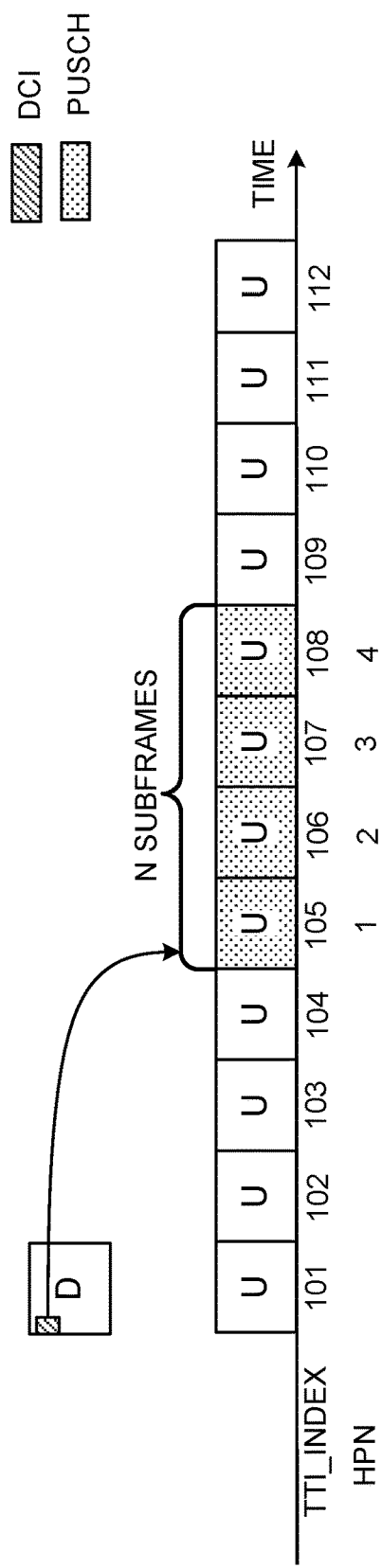
FIGS. 5A and 5B illustrate a second HPN determination example according to the first aspect of this Embodiment.

For example, as illustrated in FIG. 5B, a case is assumed, where the UL index field value "10" is included in DCI. In this case, as illustrated in FIG. 5A, using this DCI, PUSCH is scheduled in four continuous subframes indicated by the UL index field value "10" (see FIG. 3B). Moreover, a case is assumed, where a total number of HARQ processes is 8.

In this case, the HPN of the subframe of TTI index 105 is 105 modulo 8=1. The HPN of the subframe of TTI index 106 is 106 modulo 8=2. The HPN of the subframe of TTI index 107 is 107 modulo 8=3. The HPN of the subframe of TTI index 108 is 108 modulo 8=4.

In this manner, in the second HPN determination example, the HPN of each subframe is determined based on the value (e.g., a total number of HARQ processes) which is set in a user terminal in advance using higher layer signaling or broadcast information, so the HPN field in DCI may not be used. Therefore, in the second HPN determination example, the overhead of DCI can be reduced.

Note that, in the second HPN determination example, the HPN field in DCI may be omitted as illustrated in FIG. 5B, or may be used for another purpose. For example, the HPN field value may indicate at least one of the listening schemes (UL LBT mechanism) of UL, the counter for random back-off, and the configuration of a partial subframe.

As described above, in the first aspect, the HPN used in each of a plurality of subframes to be scheduled using single DCI is determined based on a predetermined rule, so also when the asynchronous HARQ is supported in multi-subframe scheduling, the re-transmission control of UL data can be appropriately performed.

(Second Aspect)

In the second aspect, a method will be described for determining which to perform, the first-time transmission or the re-transmission in each of a plurality of subframes to be scheduled using single DCI, and determining a Redundancy Version in each of the plurality of subframes. Note that the second aspect can be combined with the first aspect, and hereinafter differences from the first aspect will be mainly described.

In the second aspect, a user terminal may determine, when PUSCH in a plurality of subframes is scheduled using single DCI, a New Data Indicator (NDI) and/or Redundancy Version (RV) used in each of the plurality of subframes.

Here, the New Data Indicator (NDI) indicates which to perform, the first-time transmission or re-transmission of UL data. For example, when the NDI corresponding to the data of the identical HPN has not been toggled yet (in the case of the same value as the previous one), execution of the re-transmission of UL data may be indicated, while when NDI has been already toggled (in the case of the value different from the previous one), execution of the first-time transmission of UL data may be indicated. Accordingly, determining NDI of each subframe has the same meaning as determining which to perform, first-time transmission or re-transmission, in each subframe.

The Redundancy Version (RV) is used in coding and rate-matching of UL data, and indicates a difference in the redundancy of UL data. The value of the Redundancy Version is 0, 1, 2, or 3, for example. 0 is used for first-time transmission because it indicates the lowest degree of redundancy.

Specifically, NDI and/or RV (hereinafter, referred to as NDI/RV) in each subframe may be determined based on a predetermined rule (referred to as the first NDI/RV determination example), or may be determined based on a predetermined rule and on the information included in DCI (referred to as the second to fourth NDI/RV determination examples).

<First NDI/RV Determination Example>

FIG. 6 illustrates the first NDI/RV determination example according to the second aspect. In the first NDI/RV determination example, a user terminal determines the NDI/RV of each subframe to be scheduled, based on whether or not the scheduling is multi-subframe scheduling (e.g., based on the UL index value in DCI). Note that, in the below, a case where HPN is determined using the first HPN determination example will be illustrated, but HPN may be determined using the second HPN determination example.

In FIG. 6, as a predetermined rule, "in the case of multi-subframe scheduling (when the UL index field value is either of "01", "10", or "11"), NDI of a plurality of scheduled subframes is "toggled" and RV is "0"" is set in a user terminal. That is, "in all of the plurality of scheduled subframes, the first-time transmission of UL data is performed with RV=0" is set.

For example, as illustrated in FIG. 6B, when the UL index field value "10" is included in DCI, as illustrated in FIG. 4A, the PUSCH in four continuous subframes is subjected to multi-subframe scheduling (see FIG. 3B). In this case, a user terminal may determine, based on the above-described predetermined rule, NDI is "toggled" in all of these four subframes and the first-time transmission of UL data is performed. Moreover, a user terminal may determine that RV is "0" in all of these four subframes.

Note that, although not illustrated, when the UL index field value in DCI is "00" (i.e., when the scheduling is not multi-subframe scheduling), a user terminal may determine, based on the value (hereinafter, referred to as the NDI value) of the NDI field in this DCI, which to perform, the first-time transmission or re-transmission of UL data, in a single subframe to be scheduled using this DCI. Moreover, a user terminal may determine the RV of this single subframe based on the value (hereinafter, referred to as the RV field value) of the RV field in this DCI.

In this manner, in the first NDI/RV determination example, in the case of multi-subframe scheduling, performing the first-time transmission in all of a plurality of subframes to be scheduled (NDI=0, RV=0) is determined in advance, so the NDI field and/or RV field in DCI may not be used. Therefore, in the first NDI/RV determination example, the overhead of DCI in the multi-subframe scheduling can be reduced.

Note that, in the first NDI/RV determination example, the NDI field and/or RV field in DCI may be omitted as illustrated in FIG. 6B, or may be used for another purpose. For example, the NDI field value and/or RV field value may indicate at least one of the listening schemes (UL LBT mechanism) of UL, the counter for random back-off, and the configuration of a partial subframe.

<Second NDI/RV Determination Example>

FIG. 7 illustrates the second NDI/RV determination example according to the second aspect. In the second NDI/RV determination example, a user terminal determines the NDI/RV of each subframe based on a relative position (e.g., the first subframe, the last subframe, or the like) among the plurality of scheduled subframes.

In FIG. 7, as a predetermined rule, "in the first or last subframe of a plurality of scheduled subframes, NDI/RV is determined based on the NDI field value and/or RV field value in DCI" and "except in the first or last subframe, the first-time transmission of UL data is performed" (i.e., NDI=toggled, RV=0) are set in a user terminal.

Figures 7A, 7B:
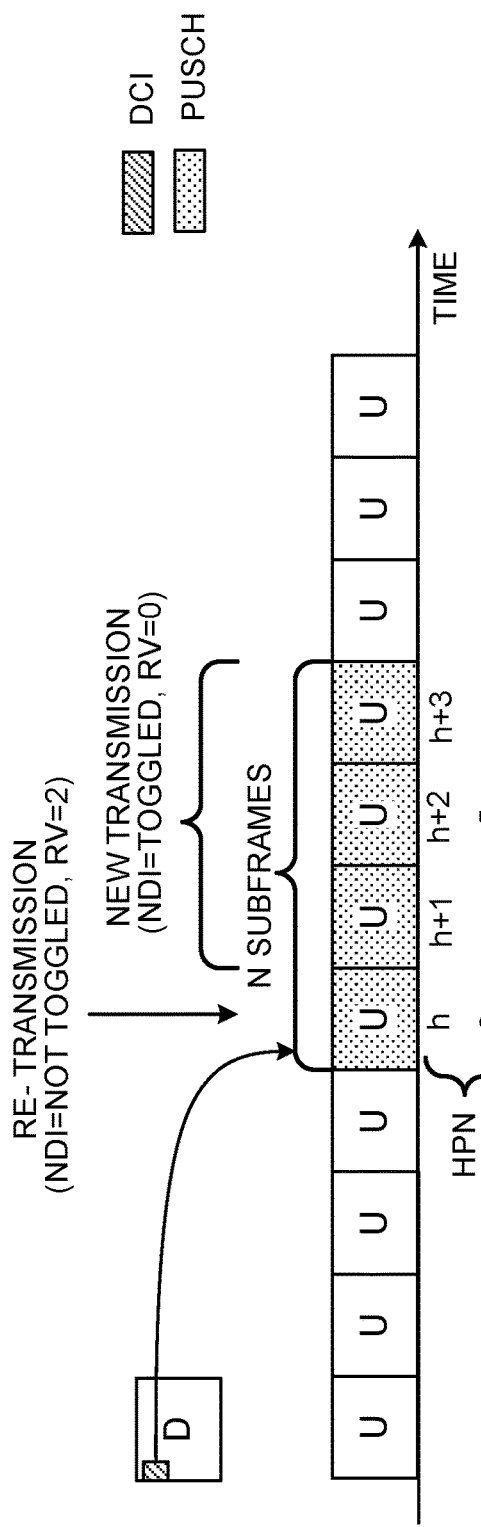
FIGS. 7A and 7B illustrate a second NDI/RV determination example according to the second aspect of this Embodiment.

For example, assuming a case where as a predetermined rule, "the first-time transmission of UL data is performed except in the first subframe of N scheduled subframes when the DCI including the UL index value "10", the NDI field value "0 (Not toggled)", and the RV field value "2" is received" is set as illustrated in FIG. 7B.

In this case, as illustrated in FIG. 7A, a user terminal determines that in the first subframe of four subframes to be scheduled using this DCI, the re-transmission of UL data is performed based on the NDI field value "not toggled" in DCI and that RV "2" is used based on the RV field value "2" in DCI.

On the other hand, a user terminal may determine that, except in the above-described first subframe, NDI is "toggled", the first-time transmission of UL data is performed, and RV "0" is used.

In this manner, in the second NDI/RV determination example, the re-transmission of UL data can be performed in some of a plurality of subframes which were subjected to multi-subframe scheduling, so a reduction in delay can be achieved as compared with the first NDI/RV determination example in which the first-time transmission of UL data is performed in all of the plurality of subframes.

<Third NDI/RV Determination Example>

FIG. 8 illustrates a third NDI/RV determination example according to the second aspect. In the third NDI/RV determination example, a user terminal determines, based on the NDI field value in DCI for scheduling a plurality of subframes, the NDI of the plurality of subframes. Moreover, a user terminal determines, in performing re-transmission in the plurality of subframes, the RV of each subframe based on the previous RV of the same HPN.

In FIG. 8, as a predetermined rule, "NDI of a plurality of scheduled subframes is based on the NDI field value in DCI for scheduling the plurality of subframes" is set in advance. Moreover, as a predetermined rule, "the RV of each of the plurality of subframes is based on the previous RV of the same HPN" is set in advance.

For example, in a case where the DCI including the UL index value "10" and the NDI field value "not toggled" is received as illustrated in FIG. 8B, a user terminal may determine the re-transmission of UL data in all of four subframes to be scheduled using this DCI, as illustrated in FIG. 8A.

In this case, a user terminal may determine the HPN of each subframe based on the previous RV of the same HPN. Specifically, the RV may be updated in accordance with a predetermined rule (e.g., in the order of 0->2->3->1).

For example, in the subframe of HPN "3" of FIG. 8A, the RV of this subframe is determined as "2" because the previous RV is "0". Moreover, in the subframe of HPN "4", the RV of this subframe is determined as "3" because the previous RV is "2". Moreover, in the subframe of HPN "5", the RV of this subframe is determined as "1" because the previous RV is "3".

On the other hand, although not illustrated, in a case where the DCI including the UL index value "10" and the NDI field value "toggled" is received, a user terminal may determine the first-time transmission of UL data in all of four subframes to be scheduled using this DCI. In this case, the RV of each subframe is determined as "0."

In this manner, in the third NDI/RV determination example, in the case of multi-subframe scheduling, it is determined, based on the NDI field value in DCI, whether to perform the first-time transmission or re-transmission in all of a plurality of subframes, and the RV of each subframe is determined based on the previous RV of the same HPN. Therefore, in the third NDI/RV determination example, DCI may not include the RV field value, and thus the overhead of DCI in the multi-subframe scheduling can be reduced.

Note that, in the third HPN determination example, the RV field value in DCI may be used for another purpose (e.g., as the value indicative of at least one of the listening scheme of UL (UL LBT mechanism), the counter for random back-off, and the configuration of a partial subframe).

<Fourth NDI/RV Determination Example>

FIG. 9 illustrates the fourth NDI/RV determination example according to the second aspect. In the fourth NDI/RV determination example, a user terminal determines the NDI of each subframe based on a bit map in DCI for scheduling a plurality of subframes. Moreover, a user terminal determines the RV of a subframe, in which re-transmission is to be performed, based on the previous RV of the same HPN.

In FIG. 9, as a predetermined rule, "NDI of a plurality of scheduled subframes is based on the bit map in DCI for scheduling the plurality of subframes" is set in advance. Moreover, as a predetermined rule, "the RV of a subframe, in which re-transmission is to be performed, is based on the previous RV of the same HPN" is set in advance.

Here, the i-th (i≥1) bit of the bit map in DCI indicates the NDI of the i-th subframe in N subframes to be scheduled using this DCI. For example, a bit map "0110" included in this DCI indicates that the NDI of the first and fourth subframes to be scheduled using this DCI is "not toggled" but the NDI of the second and third subframes is "toggled."

The number of bits of this bit map may be a fixed value, or may be a variable value. In the case of a fixed value, this number of bits may be a value (e.g., 11 bits) equal to the maximum number of subframes to be scheduled using single DCI. In the case of a variable value, this number of bits may be a value (e.g., 4 bits in FIG. 9A) equal to the number N of subframes to be scheduled using DCI.

Figures 9A, 9B:
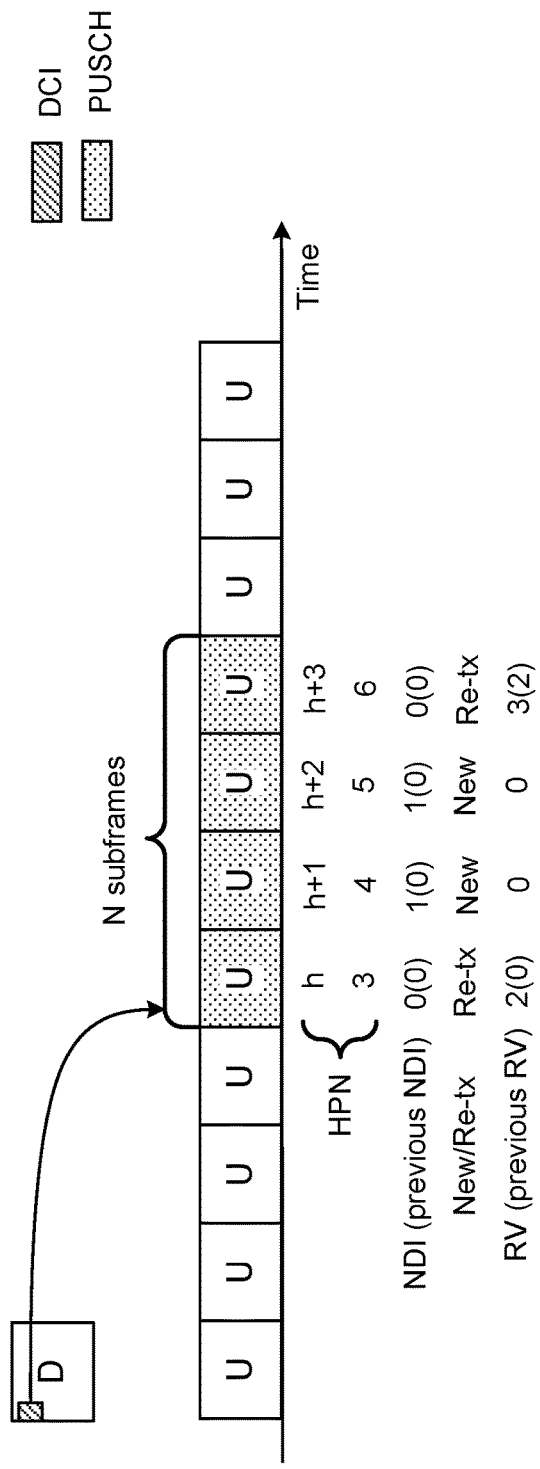
FIGS. 9A and 9B illustrate a fourth NDI/RV determination example according to the second aspect of this Embodiment.

As illustrated in FIG. 9B, this bit map may be arranged in a field (combined NDI field) formed by combining the above-described NDI field and RV field. Alternatively, the field for this bit map may be newly provided in DCI.

For example, as illustrated in FIG. 9B, in a case where the DCI including the UL index value "10" and combined NDI field value "0110" is received, a user terminal determines to firstly transmit UL data in the first and fourth subframes to be scheduled using this DCI and retransmit UL data in the second and third subframes as illustrated in FIG. 9A.

In this case, a user terminal may determine, as "0", the RV of the subframes (first and fourth subframes) in which the first-transmission is to be performed, and determine the RV of the subframes (second and third subframes), in which re-transmission is to be performed, based on the previous RV of the same HPN. Specifically, the RV of the subframe, in which re-transmission is to be performed, may be updated in accordance with a predetermined rule (e.g., in the order of 0->2->3->1).

For example, in FIG. 9A, the RV of the first subframe among four subframes to be scheduled is determined as "2" because the previous RV of the same HPN is "0." Moreover, the RV of the fourth subframe is determined as "3" because the previous RV is "2."

In this manner, in the fourth NDI/RV determination example, in the case of the multi-subframe scheduling, it is determined, based on the bit map in the DCI for scheduling a plurality of subframes, whether to perform the first-time transmission or re-transmission for each subframe. Therefore, even in performing multi-subframe scheduling, the re-transmission of UL data can be performed more flexibly and the delay time can be reduced.

As described above, in the second aspect, the NDI/RV used in each of a plurality of subframes to be scheduled using single DCI is determined based on a predetermined rule, so when supporting asynchronous HARQ in multi-subframe scheduling, the re-transmission control of UL data can be more appropriately performed.

(Third Aspect)

In a third aspect, a method will be described for improving resource utilization efficiency while achieving a reduction in delay when a plurality of subframes are scheduled using single DCI.

FIG. 10 illustrates an example of UL data transmission after listening according to this embodiment. As illustrated in FIG. 10A, when UL data (e.g., TB 1 to TB 5) of a different HPN is allocated to a plurality of subframes to be scheduled, a user terminal transmits the UL data in a subframe, in which listening was successful, and in the subsequent subframes.

For example, in FIG. 10A, listening is unsuccessful in the first subframe (or immediately before the first subframe) and listening is successful in the second subframe (or immediately before the second subframe). Therefore, a user terminal transmits UL data (TB 2 to TB 5) of a different HPN in the second to fifth subframes, respectively. In the case of FIG. 10A, the re-transmission of UL data (TB 1) which could not be transmitted due to unsuccessful listening needs to be scheduled using another DCI, so the delay of this UL data (TB 1) might occur.

On the other hand, as illustrated in FIG. 10B, when UL data (e.g., TB 1) of an identical HPN is allocated to a plurality of subframes to be scheduled, a user terminal transmits the UL data only in the subframe, in which listening was successful, and will not use the subsequent subframes.

For example, in FIG. 10B, UL data (TB 1) is transmitted only in the third subframe, in which listening was successful, and the fourth and fifth subframes will not be used. In the case of FIG. 10B, UL data can be transmitted even if listening is unsuccessful in a subframe but if listening is successful in the subsequent subframe, so the delay can be reduced. On the other hand, the more earlier listening is successful, the further the utilization efficiency might decrease.

Then, as illustrated in FIG. 10C, a user terminal may determine the UL data (e.g., TB 1) of an identical HPN among a plurality of subframes to be scheduled, and determine a different RV among the plurality of subframes. Specifically, a user terminal determines the RV of a subframe, in which listening was successful, and of the subsequent subgames in accordance with a predetermined rule.

Note that, in the third aspect, identical UL data is allocated to a plurality of subframes to be scheduled, so an identical HPN shall be used in the plurality of subframes. This HPN may be indicated by the HPN field value of DCI.

<First RV Determination Example>

FIG. 11 illustrates a first RV determination example according to the third aspect. In the first RV determination example, a user terminal sets, as "0", the RV of the first subframe (the first subframe in an idle state), in which listening was successful, and determines the RV of the subsequent subframe in accordance with a predetermined rule (e.g., in the order of 0->2->3->1).

Figure 11A:
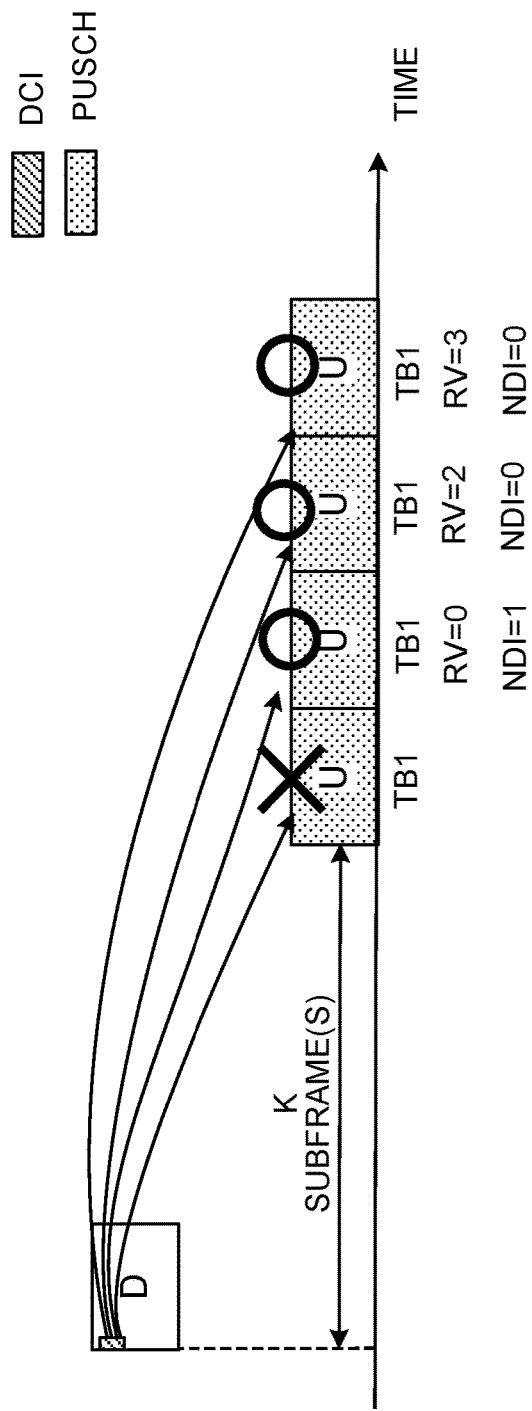
FIGS. 11A and 11B illustrate a first RV determination example according to a third aspect according to this Embodiment.

For example, in FIG. 11A, a user terminal succeeds in listening in the second subframe (or immediately before the second subframe). Therefore, the user terminal sets the RV of the second subframe as "0", and sets the RV of the third and fourth subframes as "2" and "3", respectively. Note that, because the second subframe is to be firstly transmitted, the NDI of the second subframe may be set as "toggled" and the NDI of the third and fourth subframes may be set as "not toggled."

As illustrated in FIG. 11A, when a user terminal transmits the UL data of RV "O" in the first subframe, in which listening was successful, a radio base station can decode the UL data in this first subframe. Therefore, in FIG. 11A, the decoding delay in the radio base station can be reduced.

On the other hand, a user does not know in which subframe among a plurality of scheduled subframe listening is successful, so needs to prepare, in advance, the UL data of RV assumed in each subframe. As the result, the complexity of a user terminal will increase.

Figure 11B:
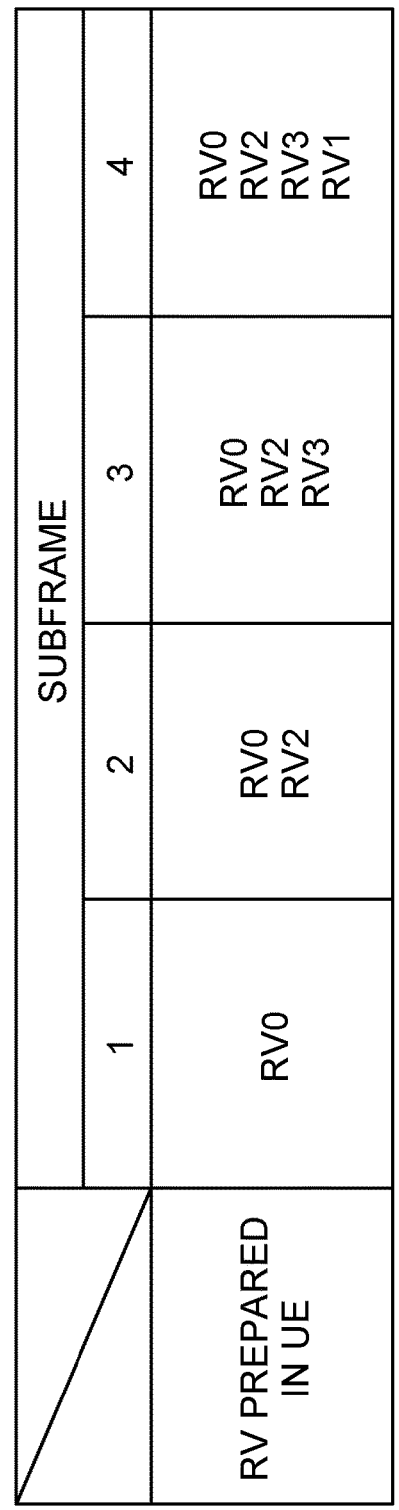

For example, in the second subframe of FIG. 11A, when listening was successful in the first subframe, RV "2" is assumed, while when this listening was unsuccessful, RV "O" is assumed. Therefore, as illustrated in FIG. 11B, a user terminal needs to prepare the UL data of RV "0" and RV "2" for the second subframe. As illustrated in FIG. 11B, similarly for the third and subsequent subframes, a user terminal needs to prepare the UL data of a plurality of RV similarly.

<Second RV Determination Example>

Figure 12:
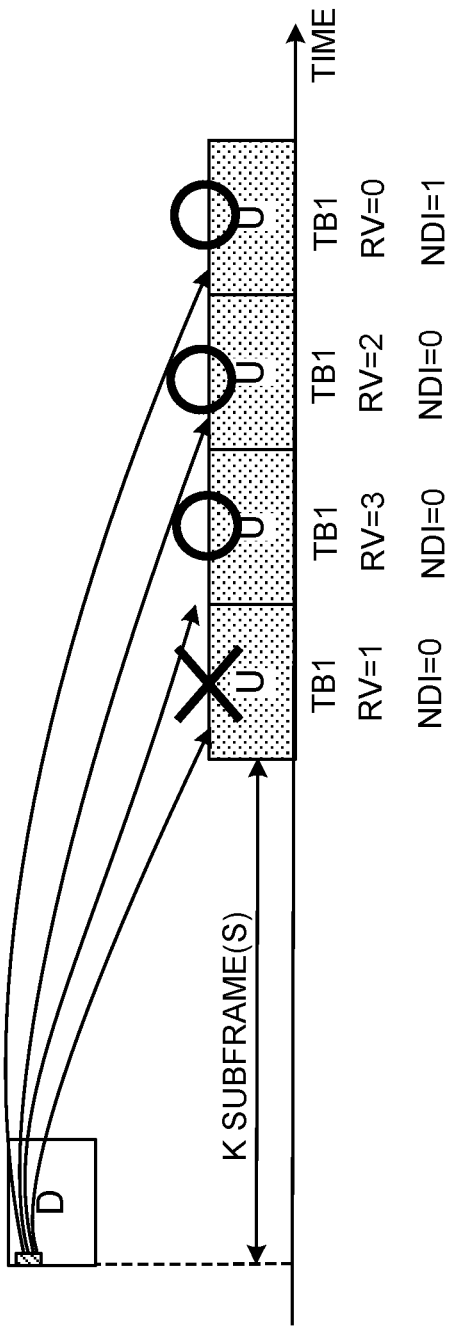
FIG. 12 illustrates a second RV determination example according to a third aspect according to this Embodiment.

FIG. 12 illustrates a second RV determination example according to the third aspect. In the second RV determination example, a user terminal sets the RV of the last subframe as "0", and determines the RV of the previous subframe in accordance with a predetermined rule (e.g., in the order from the back subframe of 0->2->3->1).

For example, in FIG. 12, a user terminal sets the RV of the fourth subframe as "0", and determines the RV of the third, second, and first subframes as "2", "3", and "1", respectively, in advance. Note that, because the fourth subframe is to be firstly transmitted, the NDI of the fourth subframe may be set as "toggled" and the NDI of the second and third subframes may be set as "not toggled."

The last subframe of a plurality of scheduled subframes can be transmitted if listening is successful in either one of the preceding subframes, so the probability to succeed in transmission is the highest. As illustrated in FIG. 12, by setting the RV of the last subframe as "0", the probability to decode UL data in a radio base station can be increased.

In the second RV determination example, the RV of a plurality of subframes to be scheduled is determined in accordance with a predetermined rule, so unlike the first RV determination example, a user terminal does not need to prepare UL data of a plurality of RV in the second and subsequent subframes in preparation for unsuccessful listening. Accordingly, in the second RV determination example, the complexity of a user terminal can be reduced as compared with the first RV determination example.

On the other hand, in the second RV determination example, even if a radio base station receives the UL data of RV "3" in the second subframe in which a user terminal succeeded in listening, the radio base station cannot complete the decoding of UL data until it receives the UL data of RV "0" in the last subframe. Therefore, the decoding delay might increase.

<Third RV Determination Example>

Figure 13:
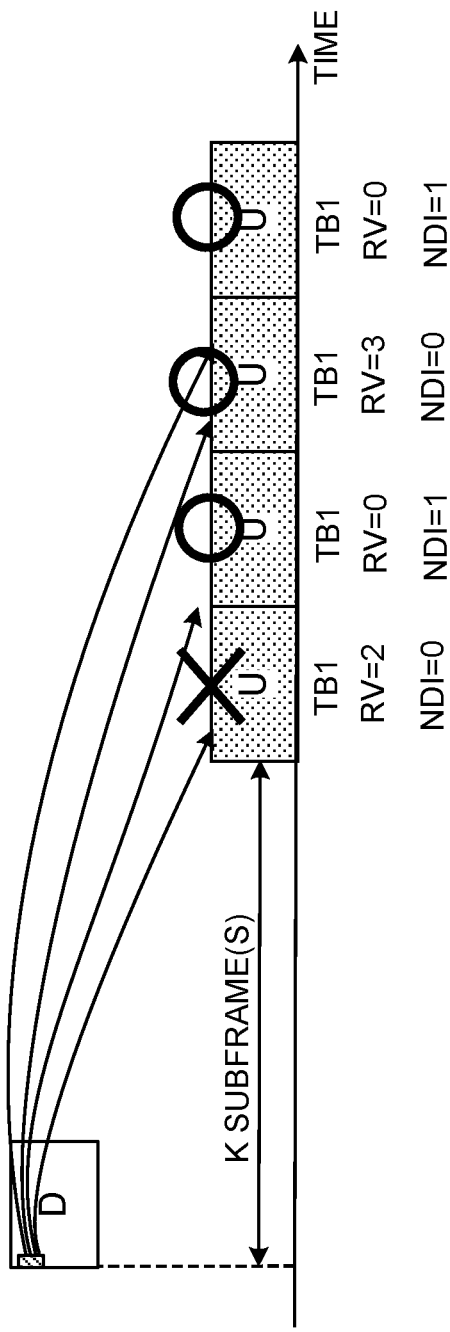
FIG. 13 illustrates a third RV determination example according to the third aspect according to this Embodiment.

FIG. 13 illustrates a third RV determination example according to the third aspect. In the third RV determination example, a user terminal determines, as "0", the RV of a subframe having a predetermined interval (e.g., two subframe cycles) in a plurality of scheduled subframes.

For example, in FIG. 13, the RV of the first subframe is set as "2", the RV of the second subframe is set as "0", the RV of the third subframe is set as "3", and the RV of the fourth subframe is set as "0." In this manner, in the third determination example, RV "0" is inserted among RV "2", RV "3", and RV "1." Because the first subframe has only one listening opportunity, the probability to succeed in transmission is low. Therefore, by inserting RV "O" at a the predetermined interval from the second subframe whose success probability of transmission is higher than the first subframe, the decoding delay in a radio base station can be reduced.

As described above, in the third aspect, even if listening is successful in a subframe at an earlier timing in a plurality of scheduled subframes, the subsequent subframe is used, so resource utilization efficiency can be increased. Because identical UL data is transmitted with a different RV in the subsequent subframe, the probability to be able to normally receive (decode) this UL data in a radio base station will increase and thus the number of times of transmission can be reduced.

(Fourth Aspect)

In a fourth aspect, switching between multi-subframe scheduling methods will be described. In scheduling a plurality of subframes using single DCI, at least one of the followings may be supported: a first UL data allocation method (e.g., FIG. 10A) for allocating the UL data (TB) of a different HPN to the plurality of subframes; and a second UL data allocation method (e.g., FIGS. 10B, 10C) for allocating the UL data of an identical HPN to the plurality of subframes. In the second UL data allocation method, a different RV may be applied among subframes (FIG. 10C).

In the fourth aspect, capability information (UE capability) of a user terminal may be provided in the first and second UL data allocation methods, respectively, or may be provided in common in the first and second UL data allocation methods. Moreover, depending on whether or not a different RV is applied among subframes, the capability information may be provided individually, or may be provided in common. This capability information may be provided to a radio base station from a user terminal, or may be provided to a user terminal from a radio base station.

Moreover, in the fourth aspect, which to use, the first UL data allocation method or the second UL data allocation method, may be switched by a predetermined field value in DCI, or may be set using higher layer signaling. Moreover, in the second UL data allocation method, whether or not a different RV is applied among subframes may be also switched by a predetermined field value in DCI, or may be set using higher layer signaling.

The first UL data allocation method and the second UL data allocation method for applying a different RV among subframes may be switched by a predetermined field value in DCI, or may be set using higher layer signaling.

(Radio Communication System)

Hereinafter, the configuration of a radio communications system according to this embodiment will be described. In this radio communications system, a radio communication method related to the above-described each aspect is applied. Note that, the radio communication method related to each aspect may be used alone, or may be used in combination.

Figure 14:
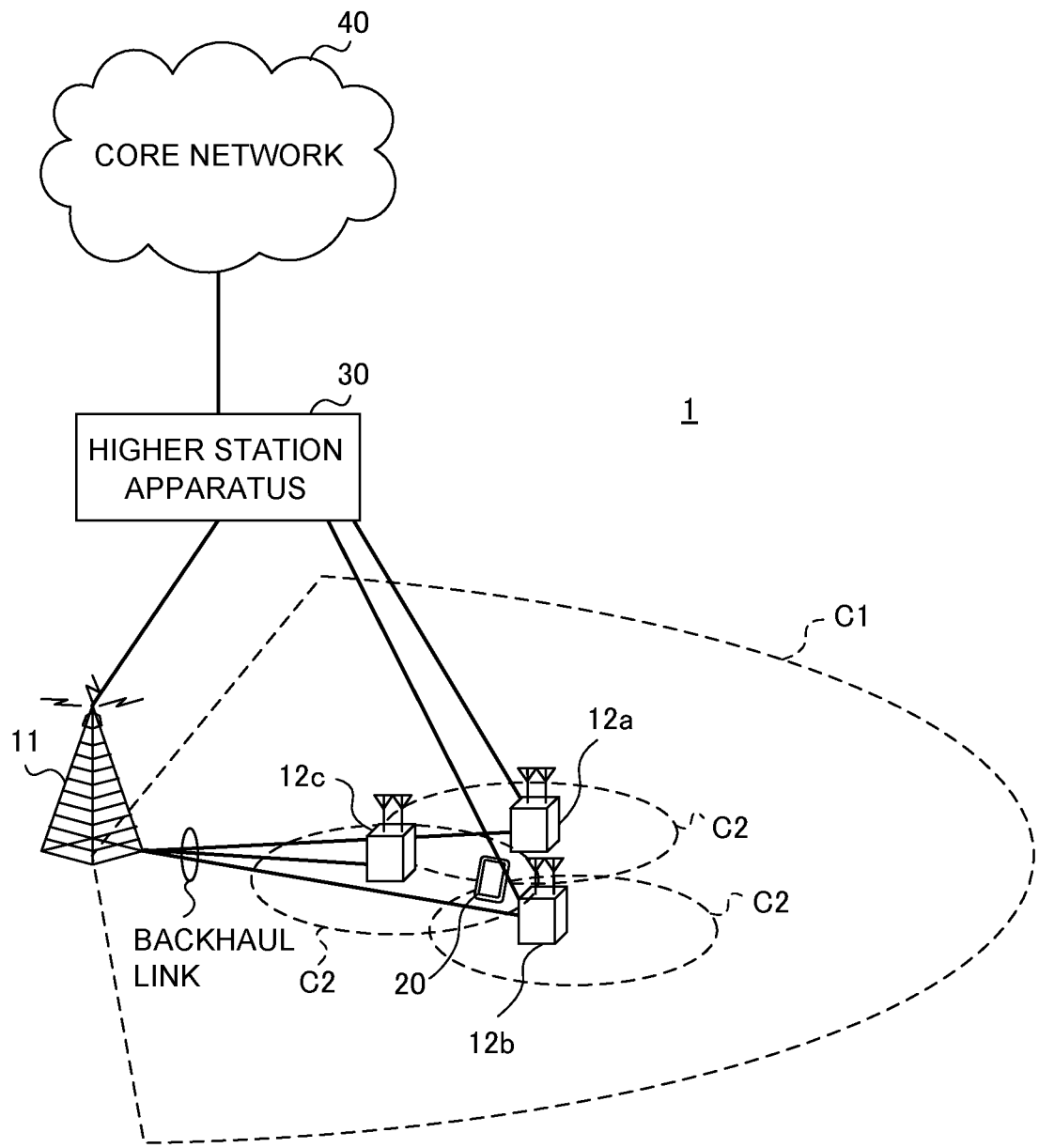
FIG. 14 illustrates an example of the schematic configuration of a radio communication system according to this Embodiment.

FIG. 14 illustrates an example of the schematic configuration example of the radio communication system according to this embodiment. In a radio communication system 1, carrier aggregation (CA), in which a plurality of base frequency blocks (component carriers) having a system bandwidth of the LTE system as one unit are aggregated, and/or dual connectivity (DC) can be applicable. The radio communication system 1 includes a radio base station (e.g., LTE-U base station) which can use an unlicensed band.

Note that, the radio communication system 1 may be referred to also as SUPER 3G, LTE-A (LTE-Advanced), IMT-Advanced, 4G (4th generation mobile communication system), 5G (5th generation mobile communication system), FRA (Future Radio Access), or the like.

The radio communication system 1 illustrated in FIG. 14 includes: a radio base station 11 forming a macro cell C1; and a radio base station 12 which is arranged in the macro cell C1 and which forms a small cell C2 narrower than the macro cells C1 (12a to 12c). Moreover, a user terminal 20 is arranged in the macro cell C1 and in each of the small cells C2. For example, a form may be contemplated, in which the macro cell C1 is used in a licensed band, while the small cell C2 is used in an unlicensed band (LTE-U). Moreover, a form may be contemplated, in which some of the small cells are used in a licensed band, while the other small cells are used in an unlicensed band.

The user terminal 20 can connect to both of the radio base station 11 and the radio base station 12. It is contemplated that the user terminal 20 concurrently uses, by CA or DC, the macro cell C1 and small cell C2, each using a different frequency. For example, the radio base station 11 using a licensed band can transmit assist information (e.g., DL signal configuration) about the radio base station 12 using an unlicensed band (e.g., LTE-U base station) to the user terminal 20. Moreover, in performing CA using a licensed band and an unlicensed band, one radio base station (e.g., radio base station 11) may be configured to control the schedule of a licensed band cell and the schedule of an unlicensed band cell.

Note that, the user terminal 20 may be configured to connect to the radio base station 12, instead of connecting to the radio base station 11. For example, the radio base station 12 using an unlicensed band may be configured to connect stand-alone to the user terminal 20. In this case, the radio base station 12 controls the scheduling of an unlicensed band cell.

The user terminal 20 and radio base station 11 can communicate with each other using a carrier (the existing carrier, referred to as Legacy carrier or the like) having a narrow bandwidth in a relatively low frequency band (e.g., 2 GHz). On the other hand, the user terminal 20 and radio base station 12 may use a carrier having a wide bandwidth in a relatively high frequency band (e.g., 3.5 GHz, 5 GHz or the like), or may use the same carrier as the one used between the user terminal 20 and the radio base station 11. Note that the configuration of the frequency band used by each radio base station is not limited thereto.

The radio base station 11 and radio base station 12 (or two radio base stations 12) can be configured to be wire-connected (e.g., using an optical fiber compliant with CPRI (Common Public Radio Interface), X2 interface, or the like) or wirelessly connected.

The radio base station 11 and each of the radio base stations 12 are connected to a higher station apparatus 30, respectively, and is connected to a core network 40 via the higher station apparatus 30. Note that, the examples of the higher station apparatus 30 include an access gateway apparatus, a Radio Network Controller (RNC), a Mobility Management Entity (MME) and the like, but not limited thereto. Each of the radio base stations 12 may be connected to the higher station apparatus 30 via the radio base station 11.

Note that, the radio base station 11 is a radio base station having a relatively wide coverage, and may be referred to also as a macro base station, aggregation node, eNB (eNodeB), transmission/reception point, or the like. The radio base station 12 is a radio base station having a local coverage, and may be referred to also as a small base station, micro-base station, pico-base station, femto-base station, HeNB (Home eNodeB), RRH (Remote Radio Head), transmission/reception point, or the like. Hereinafter, the radio base stations 11 and 12 will be collectively referred to as a radio base station 10 unless discriminated from each other. Moreover, the respective radio base stations 10 which share and use an identical unlicensed band are preferably configured to temporally synchronize with each other.

Each user terminal 20 is a terminal compliant with various types of communication schemes such as LTE and LTE-A, and may include a fixed communication terminal as well as a mobile communication terminal.

In the radio communication system 1, as the radio access schemes, Orthogonal Frequency Division Multiple Access (OFDMA) is applied to the DL while Single Carrier-Frequency Division Multiple Access (SC-FDMA) is applied to the uplink. The OFDMA is a multicarrier transmission scheme for dividing a frequency band into a plurality of narrow frequency bands (subcarriers), and mapping data to each subcarrier to perform communication. The SC-FDMA is a single-carrier transmission scheme for dividing a system bandwidth into bands including a single or continuous resource blocks for each terminal so that a plurality of terminals use mutually different bands, thereby reducing interference between terminals. Note that the uplink and downlink radio access schemes are not limited to the combination thereof.

In the radio communication system 1, a Physical Downlink Shared Channel (PDSCH) shared among the respective user terminals 20, a Physical Broadcast Channel (PBCH), downlink L1/L2 control channel, or the like is used as the downlink channel. The PDSCH may be referred to also as a downlink data channel. User data, higher layer control information, SIB (System Information Block), and the like are transmitted through the PDSCH. Moreover, an MIB (Master Information Block) is transmitted through the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), a Physical Hybrid-ARQ Indicator Channel (PHICH), and the like. Downlink control information (DCI) including the scheduling information of PDSCH and PUSCH is transmitted through the PDCCH. CFI (Control Format Indicator) which is the number of OFDM symbols used for PDCCH is transmitted through the PCFICH. Receipt confirmation information (ACK/NACK) of HARQ for PUSCH is transmitted through the PHICH. The EPDCCH is frequency-division multiplexed with the PDSCH, and is used for the transmission of DCI and the like, as with the PDCCH.

In the radio communication system 1, the Physical Uplink Shared Channel (PUSCH) shared among the user terminals 20, the uplink L1/L2 control channel (PUCCH: Physical Uplink Control Channel), the Physical Random Access Channel (PRACH), or the like is used as the uplink channel. The PUSCH may be referred to also as an uplink data channel. The user data or higher layer control information is transmitted through the PUSCH. Moreover, downlink radio quality information (CQI: Channel Quality Indicator), receipt-confirmation information (ACK/NACK), and the like are transmitted through the PUCCH. The random access preamble for establishing the connection with a cell is transmitted through the PRACH.

In the radio communication system 1, the Cell Specific Reference Signal (CRS), the Channel State Information-Reference Signal (CSI-RS), a DeModulation Reference Signal (DMRS), a detection and/or measurement reference signal (DRS: Discovery Reference Signal), or the like is transmitted as a DL reference signal. Moreover, in the radio communication system 1, a measurement reference signal (SRS: Sounding Reference Signal), the demodulation reference signal (DMRS), and the like are transmitted as a UL reference signal. Note that the DMRS may be referred to also as a user-terminal specific reference signal (UE-specific Reference Signal). The reference signals to be transmitted are not limited thereto.

<Radio Base Station>

Figure 15:
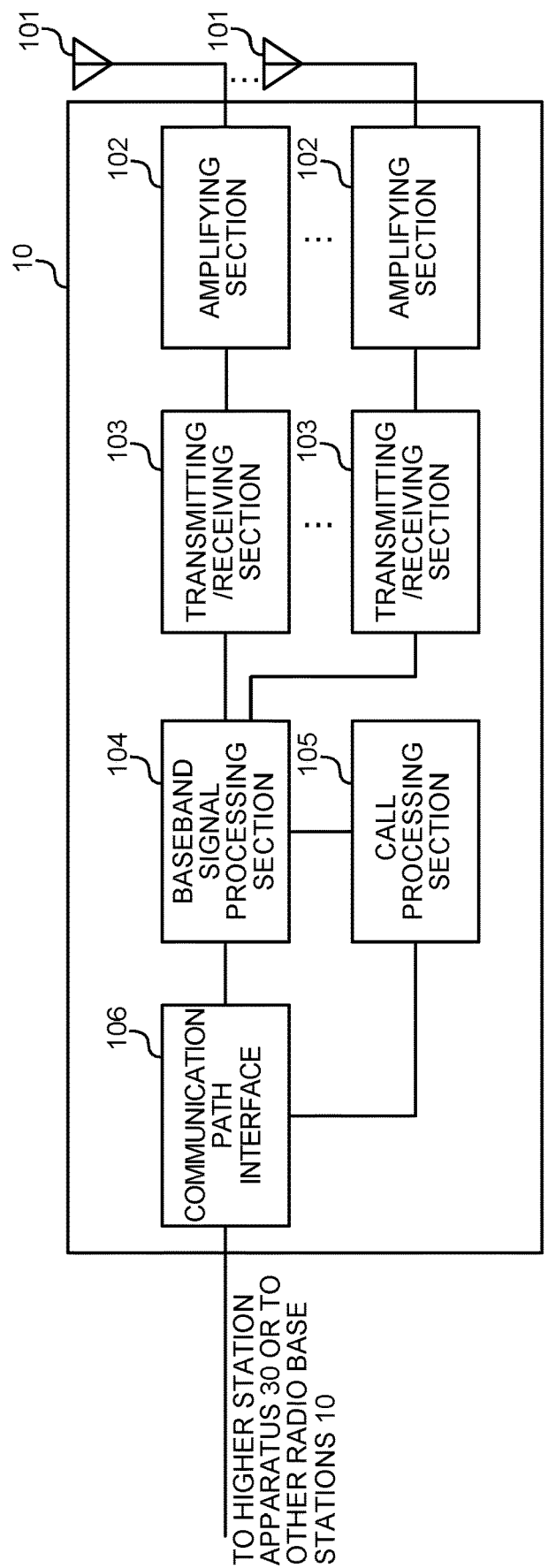
FIG. 15 illustrates an example of an entire configuration of a radio base station according to this Embodiment.

FIG. 15 illustrates an example of the whole configuration of the radio base station according to this embodiment. The radio base station 10 includes a plurality of transmission/reception antennas 101, amplifying sections 102, transmitting/receiving sections 103, a baseband signal processing section 104, a call processing section 105, and a transmission path interface 106. Note that the radio base station 10 may be configured so as to include one or more transmission/reception antennas 101, amplifying sections 102, and transmitting/receiving sections 103, respectively.

The user data transmitted to the user terminal 20 on the downlink (DL) from the radio base station 10 is input to the base band signal processing section 104 via the transmission path interface 106 from the higher station apparatus 30.

The baseband signal processing section 104 performs, on the user data, processing of a PDCP (Packet Data Convergence Protocol) layer, segmentation and concatenation of the user data, transmission processing of an RLC (Radio Link Control) layer such as transmission processing of RLC re-transmission control, MAC (Medium Access Control) re-transmission control (e.g., transmission processing of HARQ (Hybrid Automatic Repeat reQuest), scheduling, transmission format selection, channel coding, Inverse Fast Fourier Transform (IFFT) processing, and precoding processing, and transfer the resulting user data to the transmitting/receiving section 103. Moreover, the baseband signal processing section 104 performs, also on the DL control signal, transmission processing such as the channel coding or Inverse Fast Fourier Transform, and transfers the resulting DL control signal to the transmitting/receiving section 103.

The transmitting/receiving section 103 converts a baseband signal, which is pre-coded for each antenna and output from the baseband signal processing section 104, to a signal in a radio frequency band and transmits this radio frequency signal. The radio frequency signal frequency-converted by the transmitting/receiving section 103 is amplified by the amplifying sections 102 and transmitted from the transmission/reception antenna 101.

The transmission/reception 103 can transmit and receive UL and/or DL (hereinafter, referred to as UL/DL) signals using an unlicensed band. Note that the transmitting/receiving section 103 may be capable of transmitting and receiving the UL/DL signals using a licensed band. The transmitting/receiving section 103 may be configured to include a transmitter/receiver, a transmission/reception circuit, or a transmission/reception apparatus described based on the common recognition in the technical field related to the present invention. Note that, the transmitting/receiving section 103 may be configured as an integrated transmitting/receiving section, or may be configured to include a transmission section and a receiving section.

On the other hand, for the UL signal, a radio frequency signal received by the transmission/reception antenna 101 is amplified by the amplifying section 102. The transmitting/receiving section 103 receives the UL signal amplified by the amplifying section 102. The transmitting/receiving section 103 frequency-converts the received signal to a baseband signal, and outputs this baseband signal to the base band signal processing section 104.

The base band signal processing section 104 performs, on the user data included in the input UL signal, Fast Fourier Transform (FFT) processing, Inverse Discrete Fourier Transform (IDFT) processing, error correction decoding, and the reception processing of MAC re-transmission control, and the reception processing of the RLC layer and PDCP layer, and transfers the resulting user data to the higher station apparatus 30 via the transmission path interface 106. The call processing section 105 performs call processing such as setting and releasing of a communication channel, state management of the radio base station 10, and management of radio resources.

The transmission path interface 106 transmits/receives a signal to/from the higher station apparatus 30 via a predetermined interface. Moreover, the transmission path interface 106 may transmit/receive a signal (backhaul signaling) to/from another radio base station 10 via an inter-base station interface (e.g., an optical fiber compliant with CPRI (Common Public Radio Interface), the X2 interface).

Note that the transmitting/receiving section 103 transmits a DL signal to the user terminal 20 using at least an unlicensed band. For example, the transmitting/receiving section 103 transmits DCI (UL grant) for allocating PUSCH (UL data) to the user terminal 20, and DCI (DL assignment) for allocating PDSCH to the user terminal 20. Moreover, the transmitting/receiving section 103 may transmit the re-transmission control information about UL data.

Moreover, the transmitting/receiving section 103 receives a UL signal from the user terminal 20 using at least an unlicensed band. For example, the transmitting/receiving section 103 receives UL data via the PUSCH allocated by the above-described DCI (UL grant) from the user terminal 20. Moreover, the transmitting/receiving section 103 may receive the results of RRM measurement and/or CSI measurement using a licensed band and/or an unlicensed band from the user terminal 20.

Figure 16:
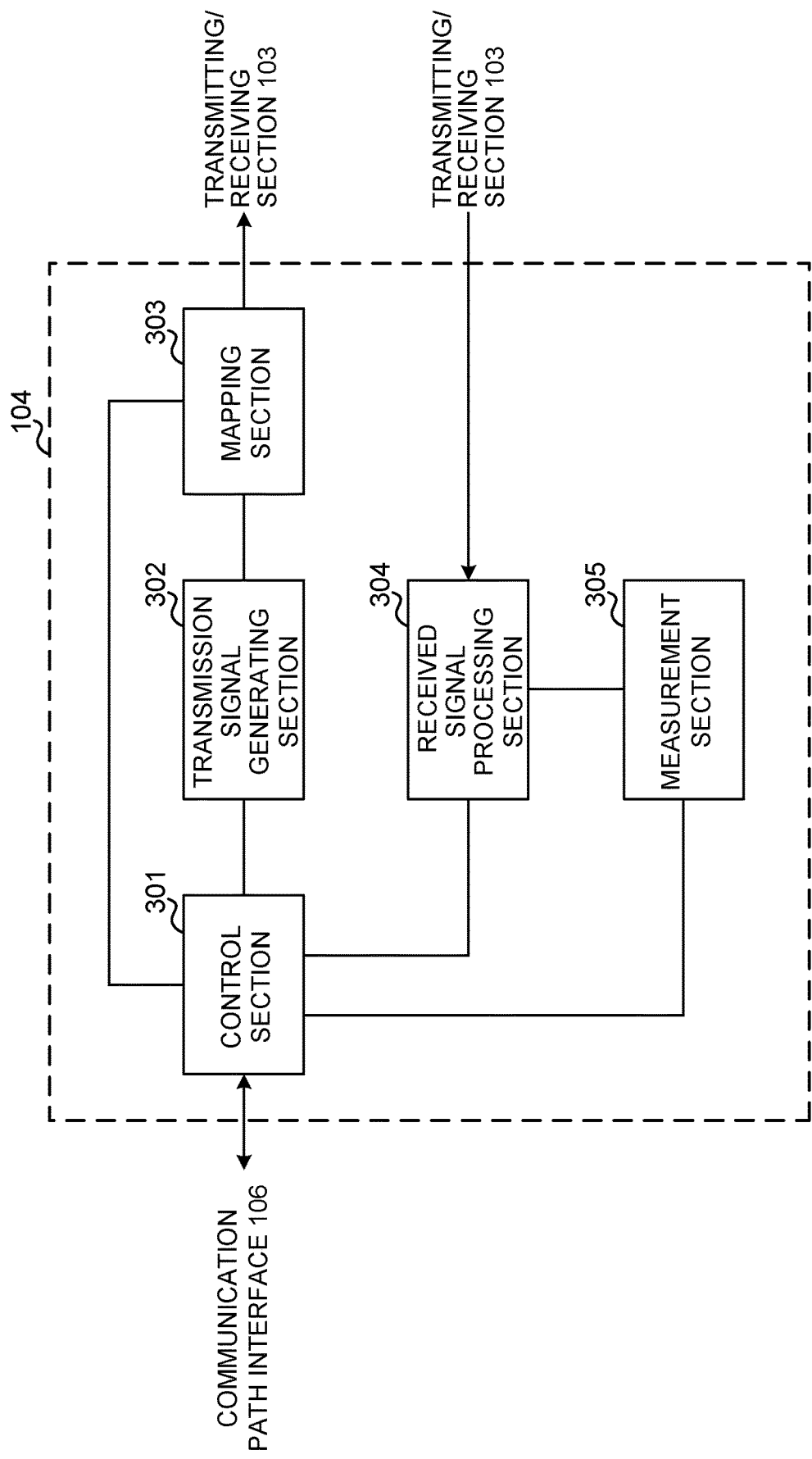
FIG. 16 illustrates an example of a function configuration of the radio base station according to this Embodiment.

FIG. 16 illustrates an example of the function configuration of the radio base station according to this embodiment. Note that, FIG. 16 mainly illustrates function blocks of a characteristic portion in this embodiment, and the radio base station 10 is assumed to include other function blocks required for radio communications. As illustrated in FIG. 16, the base band signal processing section 104 includes at least a control section (scheduler) 301, a transmission-signal generating section 302, a mapping section 303, a received-signal processing section 304, and a measurement section 305.

The control section (scheduler) 301 controls the whole radio base station 10. Note that, in a case where scheduling is performed by one control section (scheduler) 301 on a licensed band and an unlicensed band, the control section 301 controls the communication of a licensed band cell and an unlicensed band cell. The control section 301 can be the controller, control circuit, or control apparatus described based on the common recognition in the technical field related to the present invention.

The control section 301 controls the generation of a DL signal performed by the transmission-signal generating section 302 and the allocation of a DL signal performed by the mapping section 303, for example. Moreover, the control section 301 controls the reception processing of a signal performed by the received-signal processing section 304 and the measurement of a signal performed by the measurement section 305.

The control section 301 controls the scheduling, generation, mapping, transmission, and the like of DL signals (system information, DCI, DL data, DL reference signal, synchronization signal, or the like). Moreover, the control section 301 controls the LBT (listening) performed by the measurement section 305, and controls, in accordance with the LBT result, the transmission of a DL signal in the transmission-signal generating section 302 and mapping section 303.

The control section 301 controls the scheduling, reception, or the like of UL signals (UL data, UCI, PRACH, UL reference signal, or the like). Specifically, the control section 301 may schedule the transmission of UL data in a single subframe (referred to as "single subframe scheduling"), or may schedule the transmission of UL data in a plurality of subframes (referred to as "multi-subframe scheduling").

Specifically, the control unit 301 may control, in scheduling PUSCH in a plurality of subframes using a single DCI, the transmission-signal generating section 302 so as to include the subframe information (e.g., UL index field value of FIG. 3B) indicative of the number of subframes to schedule in this single DCI.

The control unit 301 may control the transmission-signal generating section 302 so as to determine at least one of the HPN field value, the NDI field value, and the RV field values, and generate DCI including at least one of these HPN field value, NDI field value, and RV field value.

The control unit 301 may control the transmission-signal generating section 302 so as to generate, based on the reception processing result of UL data by the received-signal processing section 304, the DCI (e.g., UL grant) including re-transmission control information (e.g., ACK or NACK). The control unit 301 may control the transmission-signal generating section 302 so as to generate the PHICH including the re-transmission control information.

The transmission-signal generating section 302 generates a DL signal in accordance with an instruction from the control section 301, and outputs the same to the mapping section 303. The transmission-signal generating section 302 can be configured to include the signal generator, signal generation circuit, or signal generation apparatus described based on the common recognition in the technical field related to the present invention.

The transmission-signal generating section 302 generates DL signals (e.g., DCI, DL data, DL reference signal, or the like) in accordance with an instruction from the control section 301, for example. Moreover, in accordance with the coding rate, modulation scheme, or the like determined based on the result of the CSI measurement and the like in each user terminal 20, the coding processing and modulation processing are performed on the DL data signal. Moreover, the transmission-signal generating section 302 generates the DRS including PSS, SSS, CRS, CSI-RS, or the like.

The mapping section 303 maps, based on an instruction from the control section 301, the DL signal generated by the transmission-signal generating section 302 onto a predetermined radio communication resource, and outputs this result to the transmitting/receiving section 103. The mapping section 303 can be configured to include a mapper, mapping circuit, or mapping apparatus described based on the common recognition in the technical field related to the present invention.

The received-signal processing section 304 performs reception processing (e.g., de-mapping, demodulation, decoding, or the like) on the received signal input from the transmitting/receiving section 103. Here, the received signal is, for example, the UL signal transmitted from the user terminal 20. The received-signal processing section 304 can be configured to include the signal processor, signal processing circuit, or signal processing apparatus described based on the common recognition in the technical field related to the present invention.

The received-signal processing section 304 outputs the information decoded by the reception processing to the control section 301. For example, the received-signal processing section 304 performs the received-signal processing of UL data and outputs the result of the received-signal processing to the control section 301. Moreover, the received-signal processing section 304 outputs a received signal and a signal after the reception processing to the measurement section 305.

The measurement section 305 performs the measurements of a received signal. The measurement section 305 can be configured to include the measuring instrument, measuring circuit, or measurement apparatus described based on the common recognition in the technical field related to the present invention.

The measurement unit 305 performs, based on an instruction from the control section 301, LBT (listening) using a carrier (e.g., unlicensed band) to be subjected to LBT (listening), and outputs the LBT result (result of determining whether the channel state is idle or busy) to the control section 301.

The measurement section 305 may measure, for example, the received power (e.g., RSRP (Reference Signal Received Power)) of the received signal, the reception quality (e.g., RSRQ (Reference Signal Received Quality)), the channel state, or the like. The measurement results may be output to the control section 301.

<User Terminal>

Figure 17:
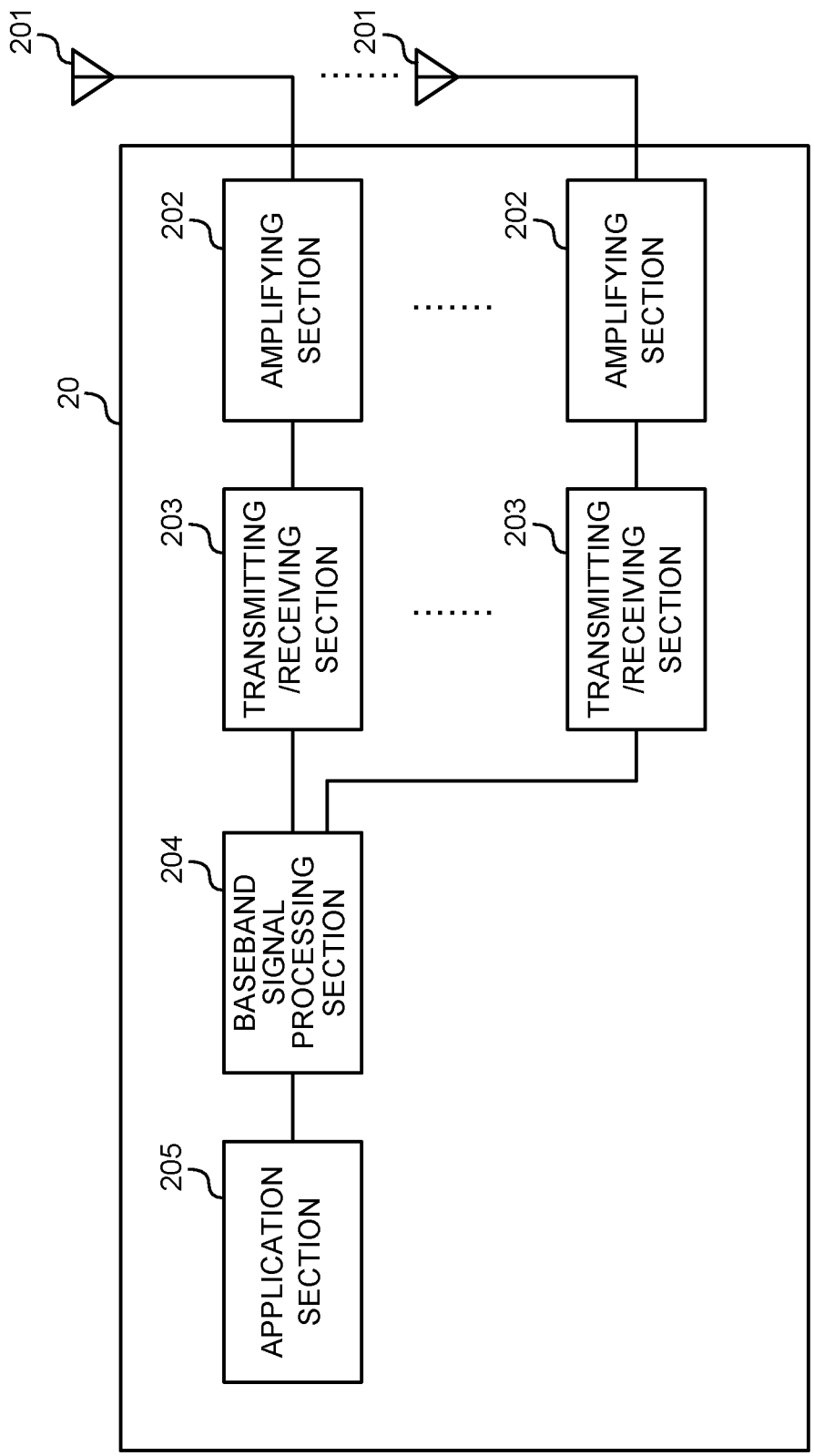
FIG. 17 illustrates an example of an entire configuration of a user terminal according to this Embodiment.

FIG. 17 illustrates an example of the whole configuration of the user terminal according to this embodiment. The user terminal 20 includes a plurality of transmission/reception antennas 201, amplifying sections 202, transmitting/receiving sections 203, a base band signal processing section 204, and an application section 205. Note that, the user terminal 20 may be configured so as to include one or more transmission/reception antennas 201, amplifying sections 202, and transmission and receiving sections 203, respectively.

The radio frequency signal received by the transmission/reception antenna 201 is amplified by the amplifying section 202. The transmitting/receiving section 203 receives the DL signal amplified by the amplifying section 202. The transmitting/receiving section 203 frequency-converts the received signal to a baseband signal, and outputs this baseband signal to the base band signal processing section 204. The transmitting/receiving section 203 can transmit and receive the UL/DL signals using an unlicensed band. Note that the transmitting/receiving section 203 may be capable of transmitting and receiving the UL and/or DL signals using a licensed band.

The transmitting/receiving section 203 may be configured to include the transmitter/receiver, transmission/reception circuit, or transmission/reception apparatus described based on the common recognition in the technical field related to the present invention. Note that, the transmitting/receiving section 203 may be configured as an integrated transmitting/receiving section, or may be configured to include a transmission section and a receiving section.

The base band signal processing section 204 performs the FFT processing, error correction decoding, the reception processing of re-transmission control, or the like on an input baseband signal. Downlink user data is transferred to the application section 205. The application section 205 performs the processing concerning layers higher than the physical layer or MAC layer, and the like. Moreover, among the downlink data, broadcast information is also transferred to the application section 205.

On the other hand, the user data on the uplink (UL) is input to the baseband signal processing section 204 from the application section 205. The baseband signal processing section 204 performs, on this user data, the transmission processing of re-transmission control (e.g., transmission processing of HARQ), channel coding, precoding, Discrete Fourier Transform (DFT) processing, IFFT processing and the like, and transfers the resulting user data to the transmitting/receiving section 203. The transmitting/receiving section 203 converts the baseband signal output from the baseband signal processing section 204 to a signal in a radio frequency band, and transmits the signal. The radio frequency signal frequency-converted by the transmitting/receiving section 203 is amplified by the amplifying sections 202 and transmitted from the transmission/reception antenna 201.

Note that the transmitting/receiving section 203 receives a DL signal from the user terminal 20 using at least an unlicensed band. For example, the transmitting/receiving section 203 receives the DCI (UL grant) for allocating PUSCH (UL data) to the user terminal 20, and the DCI (DL assignment) for allocating PDSCH to the user terminal 20. Moreover, the transmitting/receiving section 203 may receive the re-transmission control information about UL data.

The transmitting/receiving section 203 transmits a UL signal from the user terminal 20 using at least an unlicensed band. For example, the transmitting/receiving section 203 transmits UL data via the PUSCH allocated by the above-described DCI (UL grant). Moreover, the transmitting/receiving section 203 may transmit the result of RRM measurement and/or CSI measurement using a licensed band and/or an unlicensed band.

Figure 18:
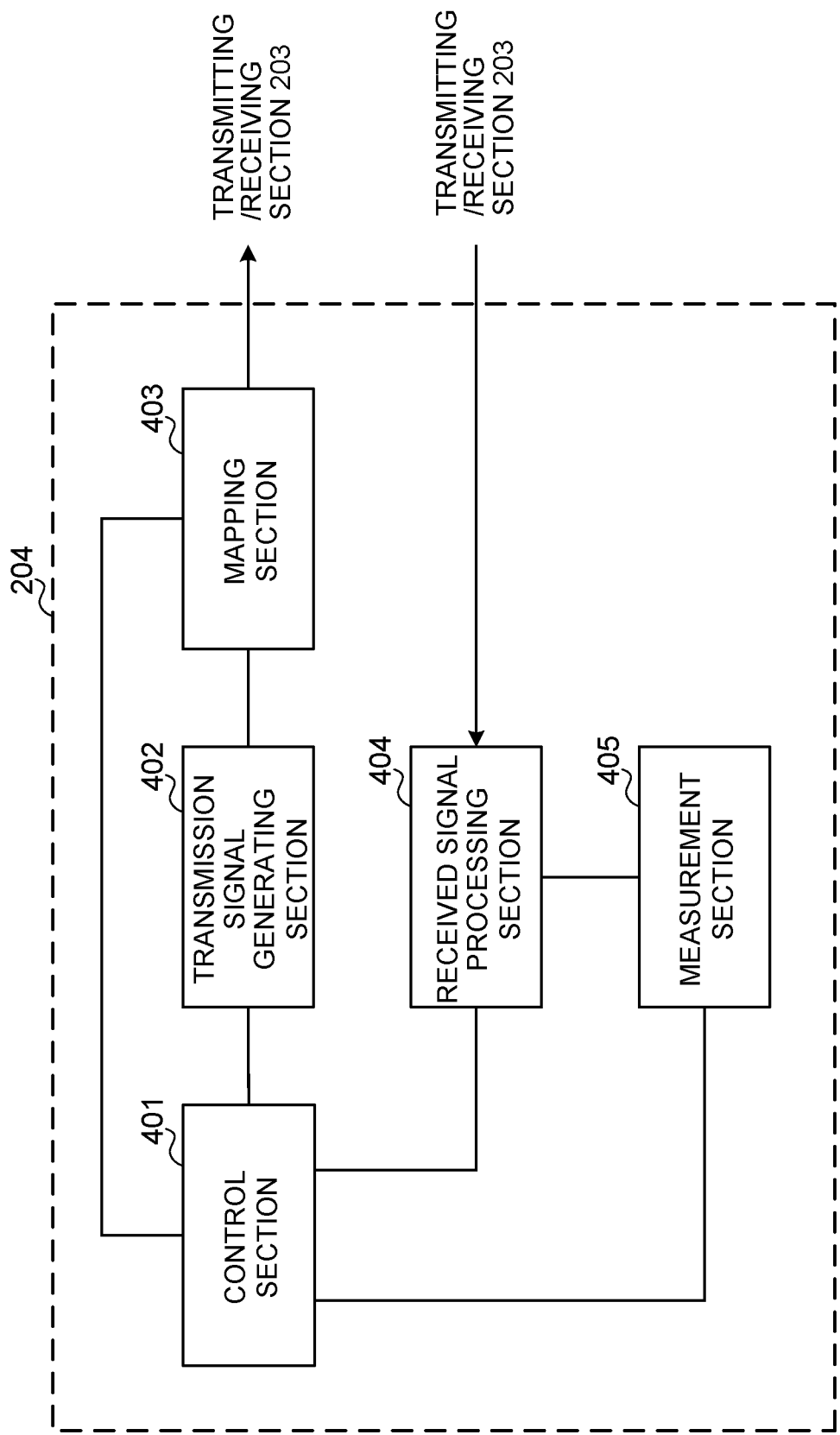
FIG. 18 illustrates an example of a function configuration of the user terminal according to this Embodiment.

FIG. 18 illustrates an example of the function configuration of the user terminal according to this embodiment. Note that, FIG. 18 mainly illustrates function blocks of a characteristic portion in this embodiment, and the user terminal 20 is assumed to include other function blocks required for radio communications. As illustrated in FIG. 18, the base band signal processing section 204 of the user terminal 20 includes at least a control section 401, a transmission-signal generating section 402, a mapping section 403, a received-signal processing section 404, and a measurement section 405.

The control section 401 controls the whole user terminal 20. The control section 401 can be configured to include the controller, control circuit, or control apparatus described based on the common recognition in the technical field related to the present invention.

The control section 401 controls the generation of a UL signal performed by the transmission-signal generating section 402 and the allocation of a UL signal performed by the mapping section 403, for example. Moreover, the control section 401 controls the reception processing of a DL signal performed by the received-signal processing section 404 and the measurement of a signal performed by the measurement section 405.

The control section 401 acquires, from the received-signal processing section 404, the DL signals (PDCCH/EPDCCH, PDSCH, DL reference signal, synchronization signal, and the like) transmitted from the radio base station 10. The control section 401 controls the generation of UL signals (e.g., PUCCH, PUSCH, and the like) based on the DCI included in the PDCCH/EPDCCH (DL control signal) or on the decoded result of the PDSCH (DL data signal).

The control unit 401 may control, in accordance with the LBT result obtained by the measurement section 405, the transmission of a UL signal in the transmission-signal generating section 402 and mapping section 403.

Specifically, the control unit 401 determines, when the transmission of UL data in a plurality of subframes is scheduled using single DCI, the HARQ process number (HPN) used in each of a plurality of subframes.

The control unit 401 may determine, when the transmission of UL data in a plurality of subframes is scheduled using single DCI, an HPN different among the plurality of subframes (the first aspect). The control section 401 can determine an HPN different among the plurality of sub-frames using the first or second HPN determination example, for example.

The control unit 401 may determine, when the transmission of UL data in a plurality of subframes is scheduled using single DCI, which to perform, the first-time transmission or re-transmission, in each of the plurality of subframes (the second aspect). The control section 401 can determine, using either of the first to fourth NDI/RV determination examples, which to perform, the first-time transmission or re-transmission, in each subframe.

The control unit 401 may determine, when the transmission of UL data in a plurality of subframes is scheduled using single DCI, the RV used in each of the plurality of subframes (the second aspect). The control section 401 can determine, using either of the first to fourth NDI/RV determination examples, the RV in each subframe.

The control unit 401 may determine, when the transmission of UL data in a plurality of subframes is scheduled using single DCI, the HPN identical among the plurality of subframes (the third aspect). In this case, the control section 401 may determine an RV different among the plurality of subframes. The control section 401 can determine an RV different among the plurality of subframes using either of the first to third RV determination examples, for example.

The control unit 401 may switch, when the transmission of UL data in a plurality of subframes is scheduled using single DCI, "an HPN different among the plurality of subframes is to be used" (referred to as the first UL data allocation method) and "the HPN identical among the plurality of subframes is to be used" (referred to as the second UL data allocation method).

For example, the control unit 401 can switch, based on a predetermined field value in DCI or on the information provided using higher layer signaling, the first UL data allocation method and the second UL data allocation method. Moreover, the control unit 401 may switch, based on a predetermined field value in DCI or on the information provided using higher layer signaling, the first UL data allocation method and the second UL data allocation method for applying an RV different among subframes, using the predetermined field value in DCI.

When the transmission of UL data in a single subframes is scheduled using single DCI, the control unit 401 may determine the HPN, NDI, and RV used in this single subframe based on the HPN field value, NDI field value, and RV field value included in this single DCI, respectively.

The control section 401 controls the received-signal processing section 404 and measurement section 405 so as to perform the RRM measurement and/or CSI measurement using a measurement reference signal in an unlicensed band. Note that the RRM measurement may be performed using the DRS. Moreover, this measurement reference signal may be either of CRS, CSI-RS, and the CSI or CSI-RS included in DRS.

The transmission-signal generating section 402 generates, based on an instruction from the control section 401, the UL signals (UL data, UCI, UL reference signal, and the like) and outputs the same to the mapping section 403. The transmission-signal generating section 402 can be configured to include the signal generator, signal generation circuit, or signal generation apparatus described based on the common recognition in the technical field related to the present invention. For example, when the DCI (UL grant) addressed to the user-terminal 20 is included in the DL control signal from the radio base station 10, the transmission-signal generating section 402 is instructed from the control section 401 to generate PUSCH.

The mapping section 403 maps, in accordance with an instruction from the control section 401, the UL signal generated by the transmission-signal generating section 402 onto a radio communication resource and outputs the resulting UL signal to the transmitting/receiving section 203. The mapping section 403 can be configured to include the mapper, mapping circuit, or mapping apparatus described based on the common recognition in the technical field related to the present invention.

The received-signal processing section 404 performs reception processing (e.g., de-mapping, demodulation, decoding, or the like) on the received signal input from the transmitting/receiving section 203. Here, the received signal is the DL signal transmitted from the radio base station 10, for example. The received-signal processing section 404 can be configured to include the signal processor, signal processing circuit, or signal processing apparatus described based on the common recognition in the technical field related to the present invention. Moreover, the received-signal processing section 404 can constitute the receiving section according to the present invention.

The received-signal processing section 404 outputs the information decoded by reception processing to the control section 401. The received-signal processing section 404 outputs broadcast information, system information, RRC signaling, DCI, or the like to the control section 401, for example. Moreover, the received-signal processing section 404 outputs a received signal and a signal after reception processing to the measurement section 405.

The measurement section 405 performs the measurements of a received signal. The measurement section 405 can be configured to include the measuring instrument, measuring circuit, or measurement apparatus described based on the common recognition in the technical field related to the present invention.

The measurement section 405 may perform, in accordance with an instruction from the control section 401, the LBT using a carrier (e.g., an unlicensed band) to be subjected to LBT. The measurement section 405 may output the LBT result (result of determining whether the channel state is idle or busy) to the control section 401.

The measurement section 405 performs the RRM measurement and CSI measurement in accordance with an instruction from the control section 401. For example, the measurement section 405 performs the CSI measurement using the measurement reference signal (either of CRS, CSI-RS, the CRS included in DRS, or the CSI-RS used for measuring CSI arranged in a transmission subframe of DRS). The measurement result is output to the control section 401, and is transmitted from the transmitting/receiving section 203 using PUSCH or PUCCH.

<Hardware Configuration>

Note that the block diagram used in describing the above-described embodiment illustrates the blocks of function units. These function blocks (components) are realized using any combination of hardware and/or software. Moreover, the realizing section for realizing each function block is not limited in particular. That is, each function block may be realized by one physically coupled apparatus, or may be realized by connecting two or more physically separated apparatuses by wire or wirelessly and using these connected apparatuses.

Figure 19:
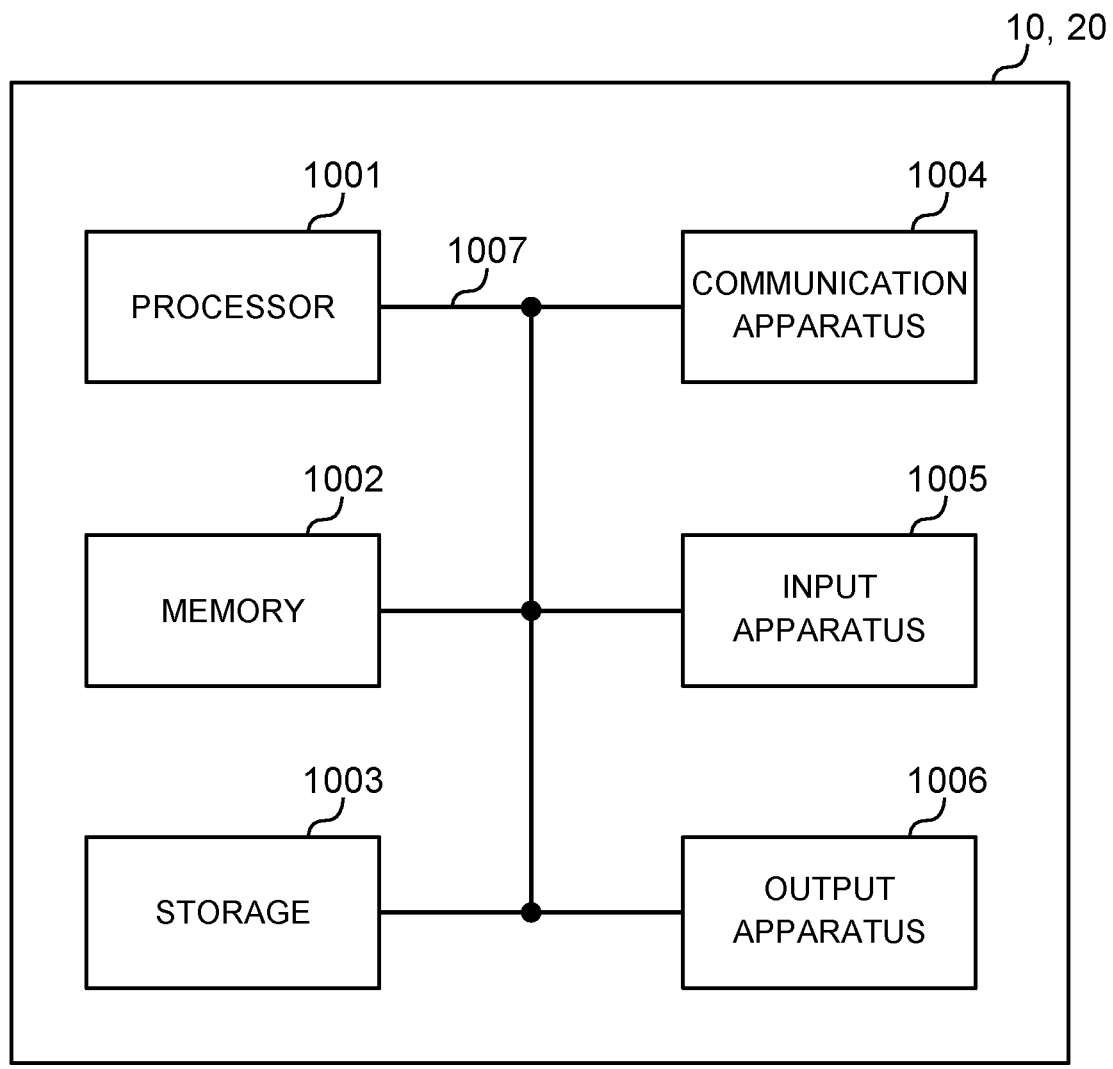
FIG. 19 illustrates an example of a hardware configuration of the radio base station and user terminal according to this Embodiment.

For example, the radio base station, user terminal, and the like in an embodiment of the present invention may function as a computer which performs the processes of the radio communication method of the present invention. FIG. 19 illustrates an example of the hardware configuration of the radio base station and user terminal according to an embodiment of the present invention. The above-described radio base station 10 and user terminal 20 may be physically configured as a computer apparatus which includes a processor 1001, a memory 1002, a storage 1003, a communication apparatus 1004, an input apparatus 1005, an output apparatus 1006, a bus 1007, and the like Note that, in the following description, the term "apparatus" can be interpreted as a circuit, a device, a unit, or the like. The hardware configuration of each of the radio base station 10 and user terminal 20 may be configured so as to include one or more of the apparatuses illustrated in the view, or may be configured without including some of the apparatuses.

Each function in the radio base station 10 and user terminal 20 is realized by causing a predetermined software (program) to be read on hardware, such as the processor 1001 and memory 1002, and thus causing the processor 1001 to carry out operations and control the communication performed by the communication apparatus 1004 and the data read and/or write in the memory 1002 and storage 1003.

The processor 1001 controls the whole computer by operating an operating system, for example. The processor 1001 may be configured as a Central Processing Unit (CPU) including an interface with a peripheral apparatus, a control apparatus, an arithmetic unit, a register, or the like. For example, the above-described base band signal processing section 104 (204), call-processing section 105, or the like may be realized using the processor 1001.

The processor 1001 reads a program (program code), a software module, or data from the storage 1003 and/or communication apparatus 1004 onto the memory 1002, and executes various types of processing in accordance with the program (program code). As the program, a program is used for causing a computer to execute at least some of the operations described in the above-described embodiments. For example, the control section 401 of the user terminal 20 may be realized by a control program which is stored in the memory 1002 and operated by the processor 1001, and the other function blocks may be realized in a similar manner.

The memory 1002 is a computer readable recording medium, and may be configured to include at least one of a ROM (Read Only Memory), an EPROM (Erasable Programmable ROM), and a RAM (Random Access Memory), for example. The memory 1002 may be referred to also as a register, a cache, a main memory (main storage apparatus), or the like. The memory 1002 can store the program (program code), software module, and the like which are executable in order to perform the radio communication method according to an embodiment of this invention.

The storage 1003 is a computer readable recording medium, and may be configured to include at least one of an optical disc such as a CD-ROM (Compact Disc ROM), a hard disk drive, a flexible disk, a magneto-optical disc, a flash memory, and the like. The storage 1003 may be referred to also as an auxiliary storage apparatus.

The communication apparatus 1004 is the hardware (transmission/reception device) for carrying out communications between computers via a wired and/or wireless network, and is referred to also as a network device, a network controller, a network card, a communication module, or the like, for example. For example, the above-described transmission/reception antenna 101 (201), amplifying section 102 (202), transmitting/receiving section 103 (203), transmission path interface 106, and the like may be realized by the communication apparatus 1004.

The input apparatus 1005 is an input device (e.g., a keyboard, a mouse, or the like) for receiving an external input. The output apparatus 1006 is an output device (e.g., a display, a speaker, or the like) for outputting a signal to the outside. Note that the input apparatus 1005 and output apparatus 1006 may be an integrated one thereof (e.g., a touch panel).

Moreover, the respective apparatuses, such as the processor 1001 and memory 1002, are connected to each other using the bus 1007 for communicating information. The bus 1007 may be configured as a single bus, or may be configured as buses each differ between apparatuses.

Moreover, the radio base station 10 and user terminal 20 may be configured to include hardware, such as a microprocessor, a Digital Signal Processor (DSP), an ASIC (Application Specific Integrated Circuit), a PLD (Programmable Logic Device), and FPGA (Field Programmable Gate Array), and a part or all of each function block of the radio base station 10 and user terminal 20 may be realized using these pieces of hardware. For example, the processor 1001 may be implemented by at least one of these pieces of hardware.

Note that, the term described in this specification and/or the term required for understanding of this specification may be replaced with a term having an identical or similar meaning. For example, the channel and/or symbol may be signals (signaling). Moreover, the signal may be a message. Moreover, the Component Carrier (CC) may be referred to also as a cell, a frequency carrier, a carrier frequency, or the like The radio frame may be configured to have one or more periods (frames) in the time domain. These one or more periods (frames) constituting the radio frame may be referred to also as a subframe. Furthermore, the subframe may be configured to include one or more slots in the time domain. Furthermore, the slot may be configured to include one or more symbols (OFDM symbols, SC-FDMA symbols, or the like) in the time domain.

The radio frame, subframes, slot, and symbol each represent the unit of time in transmitting a signal. For each of the radio frame, subframe, slot, and symbol, another corresponding name may be used. For example, one subframe may be referred to as a Transmission Time Interval (TTI), a plurality of continuous subframes may be referred to as TTI, or one slot may be referred to as TTI. That is, the subframe or TTI may be a subframe (1 ms) in the existing LTE, may be a period (e.g., 1 to 13 symbols) shorter than 1 ms, or may be a period longer than 1 ms.

Here, TTI refers to the minimum time unit of scheduling in radio communications, for example. For example, in the LTE system, a radio base station performs the scheduling for allocating the radio communication resource (frequency bandwidth, transmission power, or the like available in each user terminal) in the unit of TTI to each user terminal. Note that the definition of TTI is not limited thereto.

The TTI having a time length of 1 ms may be referred to also as usual TTI (TTI in LTE Rel. 8-12), normal TTI, long TTI, usual subframe, normal subframe, long subframe, or the like. The TTI shorter than the usual TTI may be referred to also as a shortened TTI, short TTI, shortened subframe, or short subframe.

The Resource Block (RB) is the unit of resource allocation in the time domain and in the frequency domain, and may include one or more continuous subcarriers in the frequency domain. Moreover, RB may include one or more symbols in the time domain, and may have the length of one slot, one subframe, or one TTI. One TTI and one subframe each may be configured to include one or more resource blocks. Note that, RB may be referred to also as a Physical Resource Block (PRB), a PRB pair, a RB pair, or the like.

Moreover, the resource block may be configured to include one or more Resource Elements (RE). For example, one RE may be the radio communication resource area for one subcarrier and one symbol.

Note that, the structures of the above-described radio frame, subframe, slot, symbol, and the like are just for illustration. For example, the configurations, such as the number of subframes included in a radio frame, the number of slots included in a subframe, the number of symbol and RB included in a slot, the number of subcarriers included in RB, the number of the symbols in TTI, the symbol length, the Cyclic Prefix (CP) length, and the like can be variously changed.

Moreover, the information, parameter, or the like described in this specification may be expressed in an absolute value, may be expressed in a relative value relative to a predetermined value, or may be expressed as another corresponding information. For example, the radio communication resource may be specified by a predetermined index.

The information, signal and the like described in this specification may be expressed using either one of various different techniques. For example, the data, instruction, command, information, signal, bit, symbol, chip, and the like referred to across the above-described description may be expressed by voltage, current, electromagnetic wave, magnetic field or magnetic particle, optical field or photon, or any combination thereof.

Moreover, the software, instruction, information, or the like may be transmitted/received via a transmission medium. For example, in cases where software is transmitted from a website, server, or another remote source using a wired technique (coaxial cable, optical fiber cable, twisted pair, digital subscriber line (DSL), or the like) and/or a wireless technique (infrared rays, microwave, or the like), these wired technique and/or wireless technique are included in the definition of the transmission medium.

Moreover, the radio base station in this specification may be interpreted as a user terminal. For example, for the configuration in which the communication between a radio base station and a user terminal is replaced with the communication between a plurality of user terminals (D2D: Device-to-Device), each aspect/embodiment of the present invention may be applied. In this case, the function of the above-described radio base station 10 may be configured as the function of the user terminal 20. Moreover, the terms, such as "uplink" and "downlink", may be interpreted as "side." For example, an uplink channel may be interpreted as a side channel.

Similarly, the user terminal in this specification may be interpreted as a radio base station. In this case, the function of the above-described user terminal 20 may be configured as the function of the radio base station 10.

Each aspect/embodiment described in this specification may be used alone, or may be used in combination, or may be switched and used in execution. Moreover, the notification of predetermined information (e.g., notification of "being X") is not limited to the one explicitly performed, but may be implicitly performed (e.g., without notification of this predetermined information).

The notification of information is not limited to the methods of the aspects/embodiments described in this specification, but may be performed using another method. For example, the notification of information may be performed using physical layer signaling (e.g., DCI (Downlink Control Information), UCI (Uplink Control Information), higher layer signaling (e.g., RRC (Radio Resource Control) signaling), broadcast information (MIB (Master Information Block), SIB (System Information Block) or the like), MAC (Medium Access Control) signaling, another signal, or a combination thereof. Moreover, the RRC signaling may be referred to as an RRC message, and for example may be an RRC connection setup (RRC Connection Setup) message, an RRC connection reconfiguration (RRC Connection Reconfiguration) message, or the like. Moreover, the MAC signaling may be provided using a MAC control element (MAC CE (Control Element)), for example.

Each of the aspects/embodiments described in this specification may be applied to a system which uses LTE (Long Term Evolution), LTE-A (LTE-Advanced), and LTE-B (LTE-Beyond), SUPER 3G, IMT-Advanced, and 4G (4th generation mobile communication system), 5G (5th generation mobile communication system), FRA (Future Radio Access), New-RAT (Radio Access Technology), CDMA2000, UMB (Ultra Mobile Broadband), IEEE-802.11 (Wi-Fi (Registered Trademark)), IEEE-802.16 (WiMAX (Registered Trademark), IEEE-802.20, UWB (Ultra-Wide Band), Bluetooth (Registered Trademark), a system using another appropriate radio communication method, and/or the next-generation system expanded based thereon.

For the processing procedure, sequence, flow chart, and the like of each of the aspects/embodiments described in this specification, the order thereof may be changed unless any contradiction occurs. For example, regarding the method described in this specification, the elements in various steps are presented in an exemplary order, so the order thereof is not limited to the presented specific order.

In the foregoing, the present invention has been described in detail, but it is apparent to those skilled in the art that the present invention is not limited to the embodiments described in this specification. For example, the above-described respective embodiments may be used alone, or may be used in combination. The present invention can be performed as modified and changed aspects without departing from the spirits and scope of the present invention defined by the description of the claims. Accordingly, the description herein is just for illustration, and shall not have any restriction on the present invention.

This application is based on Japanese Patent Application No. 2016-073413 filed on Mar. 31, 2016, the entire contents of which are hereby incorporated by reference.

The invention claimed is:

1. A terminal comprising:
   a receiver that receives downlink control information (DCI); and
   a processor that controls transmission of an uplink shared channel in each of a plurality of subframes based on the DCI,
   wherein the processor determines an HARQ process number (HPN) to use in each of the plurality of subframes based on a HPN field included in the DCI,
   wherein the processor determines an HPN of a first subframe among the plurality of subframes to be a value of the HPN field and determines an HPN of another subframe among the plurality of subframes to be an HPN of an immediately preceding subframe plus 1, and
   wherein the processor controls the transmission of the uplink shared channel based on a new data indicator (NDI) in the DCI, and the NDI is a bitmap of bits that are equal in number to a maximum number of subframes scheduled by the DCI.

2. The terminal according to claim 1, configured such that wherein once the HPN of the other subframe exceeds a maximum value, the processor returns the HPN to 0.

3. The terminal according to claim 2, wherein the DCI includes subframe information indicating a number of the subframes.

4. The terminal according to claim 2, wherein the processor determines a redundancy version (RV) of each of the plurality of subframes based on information included in the DCI.

5. The terminal according to claim 2, wherein the DCI is one DCI.

6. The terminal according to claim 1, wherein the DCI includes subframe information indicating a number of the subframes.

7. The terminal according to claim 6, wherein the processor determines a redundancy version (RV) of each of the plurality of subframes based on information included in the DCI.

8. The terminal according to claim 1, wherein the processor determines a redundancy version (RV) of each of the plurality of subframes based on information included in the DCI.

9. The terminal according to claim 1, wherein the DCI is one DCI.

10. The terminal according to claim 1, wherein the DCI is used for scheduling of the uplink shared channel in each of the plurality of subframes in a secondary cell where listening is executed before transmission.

11. A radio communication method for a terminal, comprising:
    receiving downlink control information (DCI); and
    controlling transmission of an uplink shared channel in each of a plurality of subframes based on the DCI,
    wherein the terminal determines an HARQ process number (HPN) to use in each of the plurality of subframes based on a HPN field included in the DCI,
    wherein the terminal determines an HPN of a first subframe among the plurality of subframes to be a value of the HPN field and determines an HPN of another subframe among the plurality of subframes to be an HPN of an immediately preceding subframe plus 1, and
    wherein the terminal controls the transmission of the uplink shared channel based on a new data indicator (NDI) in the DCI, and the NDI is a bitmap of bits that are equal in number to a maximum number of subframes scheduled by the DCI.

* * * * *